(12) United States Patent
Chen et al.

(10) Patent No.: US 10,386,602 B2
(45) Date of Patent: Aug. 20, 2019

(54) OPTICAL IMAGING LENS

(71) Applicant: GENIUS ELECTRONIC OPTICAL (XIAMEN) CO., LTD., Xiamen, Fujian (CN)

(72) Inventors: Yu-Ming Chen, Taichung (TW); Pei-Chi Wang, Taichung (TW); Sheng-Wei Hsu, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 0 days.

(21) Appl. No.: 15/955,716

(22) Filed: Apr. 18, 2018

(65) Prior Publication Data

US 2019/0219796 A1    Jul. 18, 2019

(30) Foreign Application Priority Data

Jan. 15, 2018   (CN) .......................... 2018 1 0035609

(51) Int. Cl.
*G02B 9/62* (2006.01)
*G02B 27/00* (2006.01)

(52) U.S. Cl.
CPC ........... *G02B 9/62* (2013.01); *G02B 27/0037* (2013.01)

(58) Field of Classification Search
CPC .............................. G02B 9/62; G02B 27/0037
USPC ........................................................ 359/713
See application file for complete search history.

(56) References Cited

U.S. PATENT DOCUMENTS

2018/0045913 A1*   2/2018   Hsueh .................... G02B 5/005

* cited by examiner

*Primary Examiner* — Evan P Dzierzynski
*Assistant Examiner* — Mitchell T Oestreich
(74) *Attorney, Agent, or Firm* — JCIPRNET

(57) ABSTRACT

An optical imaging lens sequentially includes a first, a second, a third, a fourth, a fifth, and a sixth lens elements from an object side to an image side along an optical axis. Each of the lens elements includes an object-side surface and an image-side surface. The second lens element has negative refracting power. A periphery region of the object-side surface of the fourth lens element is convex. A periphery region of the image-side surface of the fifth lens element is convex. The optical imaging lens satisfies following conditions: HFOV≤45°; 2.000≤D1/D2, and TTL/T6≤6.300.

20 Claims, 36 Drawing Sheets

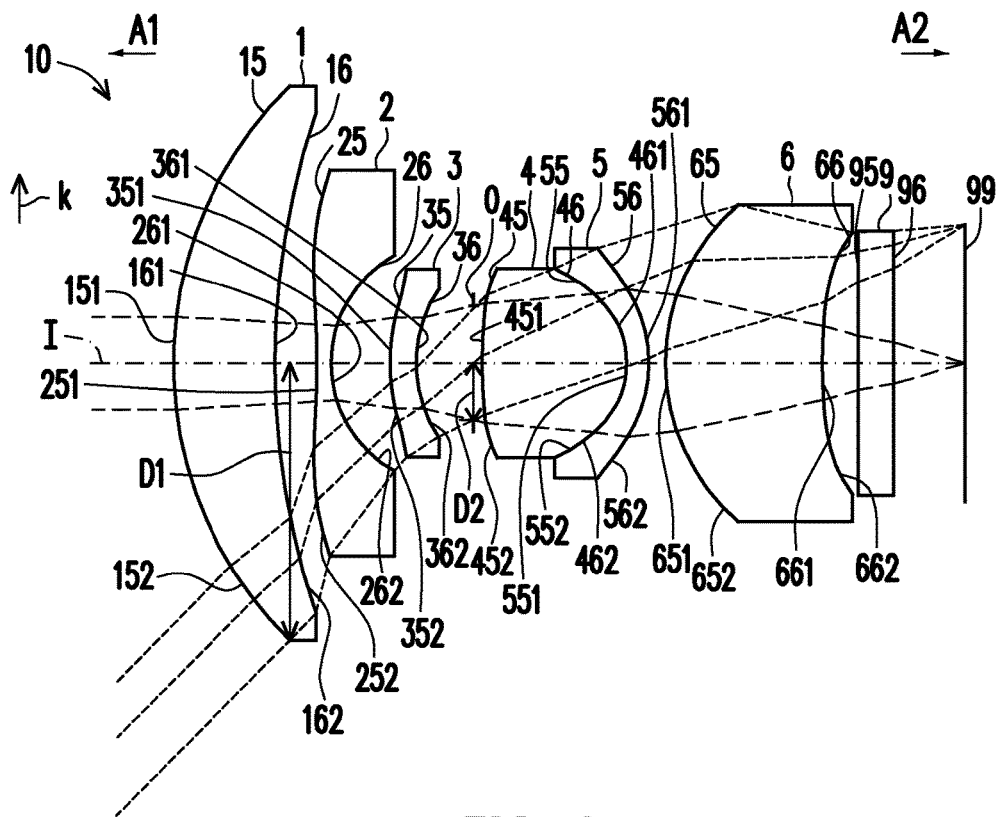
FIG. 6
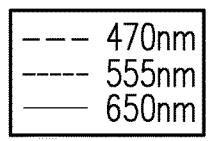
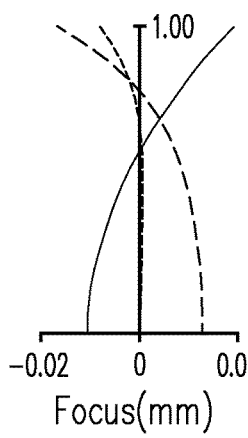
FIG. 7A
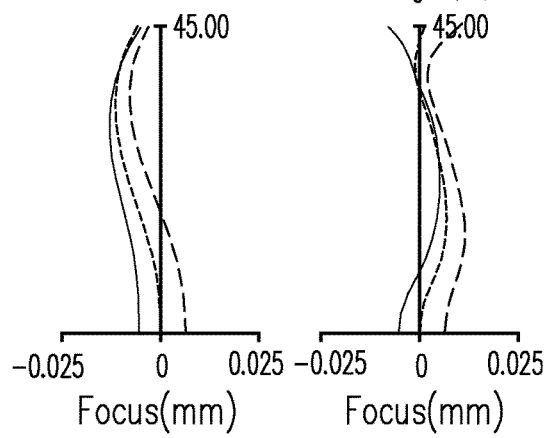
FIG. 7B
FIG. 7C
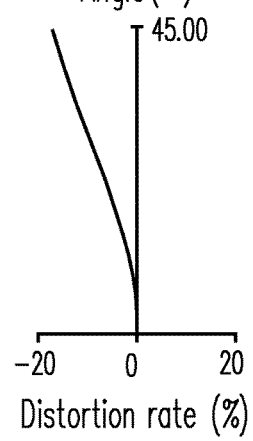
FIG. 7D

| First embodiment | | | | | | | | |
|---|---|---|---|---|---|---|---|---|
| TTL=15.592 mm, EFL=3.297 mm, HFOV=45.000°, Image height=2.715 mm, Fno=1.850 | | | | | | | | |
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 7.470 | 2.024 | 5.406 | Glass | 1.853 | 23.784 | 15.116 |
| | Image-side surface 16 | Spherical | 15.542 | 0.807 | 4.895 | | | | |
| Second lens element 2 | Object-side surface 25 | Aspheric | -12.005 | 0.300 | 3.759 | Plastics | 1.537 | 56.150 | -3.684 |
| | Image-side surface 26 | Aspheric | 2.388 | 1.142 | 2.100 | | | | |
| Third lens element 3 | Object-side surface 35 | Aspheric | 3.496 | 0.511 | 1.838 | Plastics | 1.647 | 22.418 | -46.164 |
| | Image-side surface 36 | Aspheric | 2.950 | 1.137 | 1.447 | | | | |
| Aperture stop 0 | | Spherical | Infinite | 0.162 | 1.107 | | | | |
| Fourth lens element 4 | Object-side surface 45 | Aspheric | 11.449 | 2.837 | 1.322 | Plastics | 1.537 | 56.150 | 32.778 |
| | Image-side surface 46 | Aspheric | -1.639 | 0.010 | 1.839 | Cemented material | 1.537 | 56.150 | |
| Fifth lens element 5 | Object-side surface 55 | Aspheric | -1.639 | 0.427 | 1.841 | Plastics | 1.647 | 22.418 | 5.523 |
| | Image-side surface 56 | Aspheric | -2.651 | 0.338 | 2.241 | | | | |
| Sixth lens element 6 | Object-side surface 65 | Aspheric | 3.944 | 3.092 | 3.071 | Plastics | 1.537 | 56.150 | 10.280 |
| | Image-side surface 66 | Aspheric | 10.043 | 0.705 | 2.542 | | | | |
| Filter 9 | Object-side surface 95 | | Infinite | 0.700 | 2.553 | Glass | 1.518 | 64.166 | |
| | Image-side surface 96 | | Infinite | 1.400 | 2.593 | | | | |
| | Image plane 99 | | Infinite | | | | | | |

FIG. 8

| Sur-face | K | a2 | a4 | a6 | a8 |
|---|---|---|---|---|---|
| 25 | -8.314693E+01 | 0.000000E+00 | 5.512571E-03 | -3.588348E-04 | 1.528027E-05 |
| 26 | -1.712918E-02 | 0.000000E+00 | -6.575595E-04 | -7.702935E-04 | 3.810781E-04 |
| 35 | -8.229529E+00 | 0.000000E+00 | 1.749404E-02 | -1.050509E-02 | 2.822122E-03 |
| 36 | 2.441125E+00 | 0.000000E+00 | 5.098197E-03 | -7.946115E-03 | 2.230272E-03 |
| 45 | 0.000000E+00 | 0.000000E+00 | 8.173793E-03 | 6.100218E-04 | 8.427223E-05 |
| 46 | -1.000000E+00 | 0.000000E+00 | -2.106291E-02 | 1.921719E-03 | -4.659313E-03 |
| 55 | -1.000000E+00 | 0.000000E+00 | -2.106291E-02 | 1.921719E-03 | -4.659313E-03 |
| 56 | 0.000000E+00 | 0.000000E+00 | 3.026896E-03 | 8.861599E-04 | -4.183381E-04 |
| 65 | 0.000000E+00 | 0.000000E+00 | -2.612342E-04 | -2.545746E-04 | 8.252539E-05 |
| 66 | 0.000000E+00 | 0.000000E+00 | 4.314655E-03 | -3.699283E-04 | 2.176613E-04 |
| Sur-face | a10 | a12 | a14 | a16 | |
| 25 | -2.216081E-07 | -2.666866E-09 | 0.000000E+00 | 0.000000E+00 | |
| 26 | -3.720166E-05 | -7.046566E-07 | 0.000000E+00 | 0.000000E+00 | |
| 35 | -7.357623E-04 | 9.504601E-05 | 0.000000E+00 | 0.000000E+00 | |
| 36 | -1.022675E-03 | 0.000000E+00 | 0.000000E+00 | 0.000000E+00 | |
| 45 | 6.201063E-05 | -1.417197E-05 | 0.000000E+00 | 0.000000E+00 | |
| 46 | 1.914496E-03 | -3.738401E-04 | 2.093404E-05 | 0.000000E+00 | |
| 55 | 1.914496E-03 | -3.738401E-04 | 2.093404E-05 | 0.000000E+00 | |
| 56 | 2.210145E-04 | -4.117459E-05 | 3.398778E-06 | 0.000000E+00 | |
| 65 | -1.297450E-05 | 1.026728E-06 | -3.236135E-08 | 0.000000E+00 | |
| 66 | -3.753277E-05 | 3.697857E-06 | -9.060177E-08 | 0.000000E+00 | |

FIG. 9

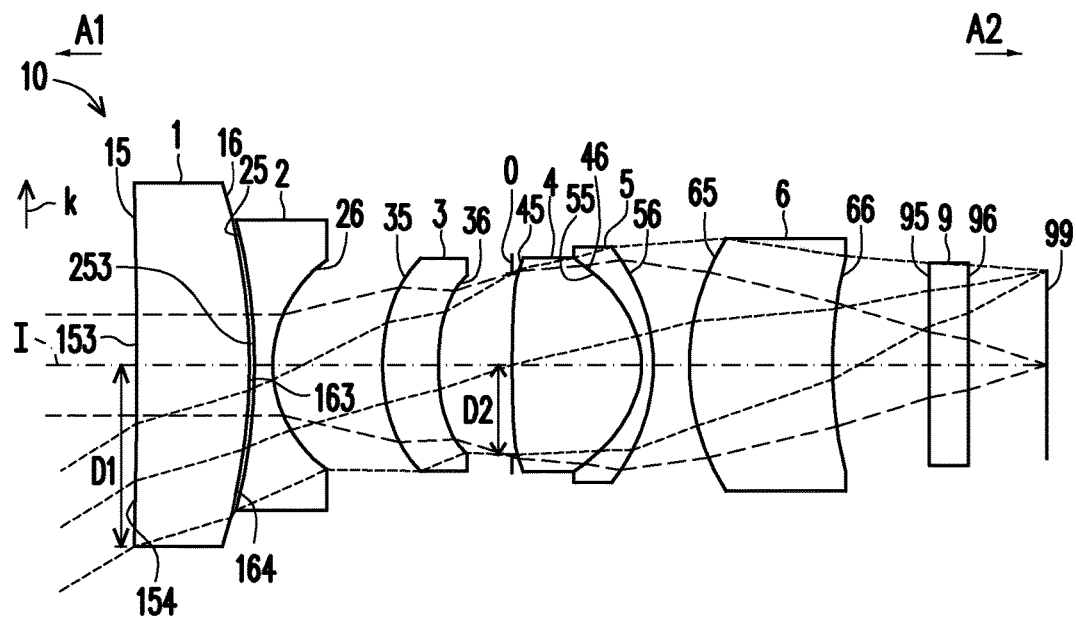
FIG. 10
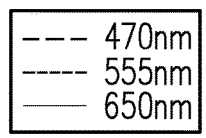
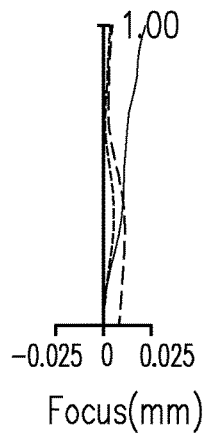
Longitudinal spherical aberration
Field of view
FIG. 11A
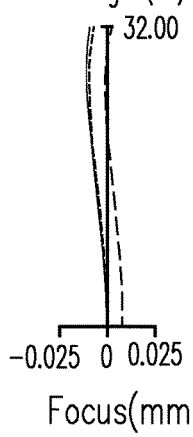
Field curvature (sagittal direction)
Angle (°)
FIG. 11B
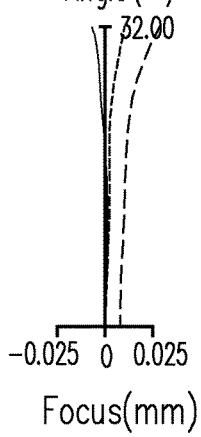
Field curvature (tangential direction)
Angle (°)
FIG. 11C
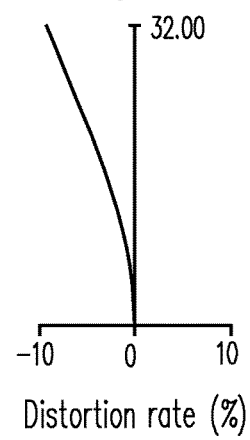
Distortion
Angle (°)
FIG. 11D

| Second embodiment | | | | | | | | | |
|---|---|---|---|---|---|---|---|---|---|
| TTL=16.214 mm, EFL=2.926 mm, HFOV=32.000°, Image height=1.659 mm, Fno=1.700 | | | | | | | | | |
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | -73.181 | 2.000 | 3.203 | Glass | 1.853 | 23.784 | 14.051 |
| | Image-side surface 16 | Spherical | -10.429 | 0.100 | 2.737 | | | | |
| Second lens element 2 | Object-side surface 25 | Aspheric | -4.915 | 0.308 | 2.560 | Plastics | 1.537 | 56.150 | -3.143 |
| | Image-side surface 26 | Aspheric | 2.625 | 1.951 | 1.828 | | | | |
| Third lens element 3 | Object-side surface 35 | Aspheric | 3.137 | 1.005 | 1.870 | Plastics | 1.647 | 22.418 | 16.532 |
| | Image-side surface 36 | Aspheric | 3.880 | 1.304 | 1.568 | | | | |
| Aperture stop 0 | | Spherical | Infinite | 0.010 | 1.602 | | | | |
| Fourth lens element 4 | Object-side surface 45 | Aspheric | 47.847 | 2.298 | 1.679 | Plastics | 1.537 | 56.150 | 136.982 |
| | Image-side surface 46 | Aspheric | -1.639 | 0.010 | 1.886 | Cemented material | 1.537 | 56.150 | |
| Fifth lens element 5 | Object-side surface 55 | Aspheric | -1.639 | 0.200 | 1.887 | Plastics | 1.647 | 22.418 | 6.687 |
| | Image-side surface 56 | Aspheric | -3.008 | 0.658 | 2.073 | | | | |
| Sixth lens element 6 | Object-side surface 65 | Aspheric | 3.786 | 2.574 | 2.220 | Plastics | 1.537 | 56.150 | 9.446 |
| | Image-side surface 66 | Aspheric | 11.391 | 1.696 | 1.904 | | | | |
| Filter 9 | Object-side surface 95 | | Infinite | 0.700 | 1.793 | Glass | 1.518 | 64.166 | |
| | Image-side surface 96 | | Infinite | 1.400 | 1.759 | | | | |
| | Image plane 99 | | Infinite | | | | | | |

FIG. 12

| Surface | K | a2 | a4 | a6 | a8 |
|---|---|---|---|---|---|
| 25 | -1.410040E+01 | 0.000000E+00 | 5.649860E-03 | -5.638549E-04 | -4.721752E-06 |
| 26 | 1.538799E-01 | 0.000000E+00 | 9.081898E-03 | 3.374400E-04 | 6.392788E-04 |
| 35 | -6.983678E+00 | 0.000000E+00 | 2.562523E-02 | -7.378576E-03 | 3.487249E-03 |
| 36 | 3.970766E+00 | 0.000000E+00 | 7.667848E-03 | -2.931898E-03 | 2.322365E-03 |
| 45 | 0.000000E+00 | 0.000000E+00 | 1.081943E-02 | -1.343002E-04 | 4.320094E-05 |
| 46 | -1.000000E+00 | 0.000000E+00 | -1.396394E-02 | 6.751254E-03 | -4.773252E-03 |
| 55 | -1.000000E+00 | 0.000000E+00 | -1.396394E-02 | 6.751254E-03 | -4.773252E-03 |
| 56 | 0.000000E+00 | 0.000000E+00 | 2.659327E-03 | 7.979676E-04 | -4.639500E-04 |
| 65 | 0.000000E+00 | 0.000000E+00 | -1.288232E-03 | -4.578764E-04 | 7.820271E-05 |
| 66 | 0.000000E+00 | 0.000000E+00 | 4.950812E-03 | -3.628506E-04 | 2.033737E-04 |
| Surface | a10 | a12 | a14 | a16 | |
| 25 | -4.794319E-07 | 1.753769E-07 | 0.000000E+00 | 0.000000E+00 | |
| 26 | 5.772724E-05 | -1.498152E-05 | 0.000000E+00 | 0.000000E+00 | |
| 35 | -6.919697E-04 | 6.819554E-05 | 0.000000E+00 | 0.000000E+00 | |
| 36 | -3.396251E-04 | 0.000000E+00 | 0.000000E+00 | 0.000000E+00 | |
| 45 | 5.813226E-05 | -4.839491E-06 | 0.000000E+00 | 0.000000E+00 | |
| 46 | 1.673573E-03 | -2.821764E-04 | 1.924479E-05 | 0.000000E+00 | |
| 55 | 1.673573E-03 | -2.821764E-04 | 1.924479E-05 | 0.000000E+00 | |
| 56 | 2.103861E-04 | -4.222121E-05 | 3.943689E-06 | 0.000000E+00 | |
| 65 | -1.507224E-05 | 7.481250E-07 | 4.513982E-08 | 0.000000E+00 | |
| 66 | -5.262717E-05 | 1.345020E-06 | 6.836878E-07 | 0.000000E+00 | |

FIG. 13

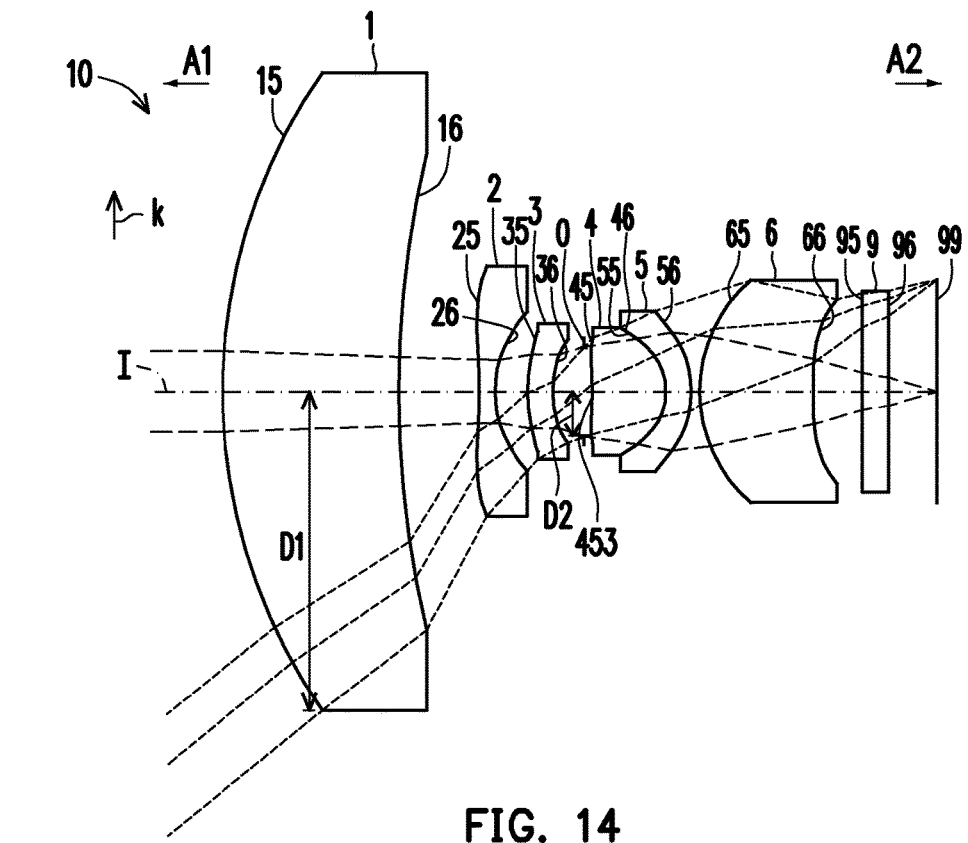
FIG. 14
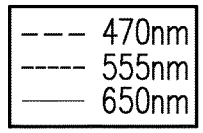
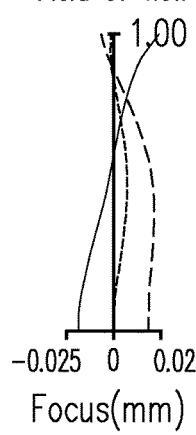
Longitudinal
spherical aberration
Field of view
FIG. 15A
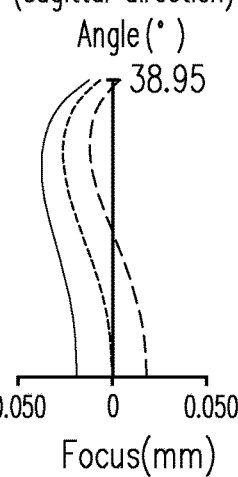
Field curvature
(sagittal direction)
Angle (°)
FIG. 15B
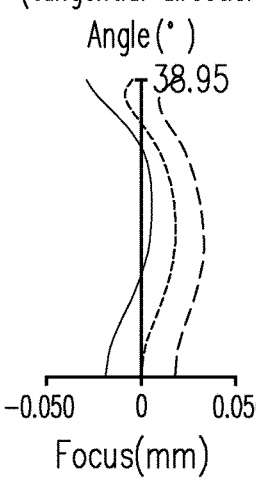
Field curvature
(tangential direction)
Angle (°)
FIG. 15C
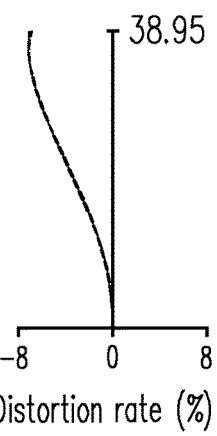
Distortion
Angle (°)
FIG. 15D

| Third embodiment |||||||||
|---|---|---|---|---|---|---|---|---|
| TTL=20.000 mm, EFL=4.137 mm, HFOV=38.950°, Image height=3.110 mm, Fno=1.850 |||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 15.650 | 4.968 | 8.885 | Glass | 1.853 | 23.784 | 32.413 |
| | Image-side surface 16 | Spherical | 30.792 | 2.198 | 6.679 | | | | |
| Second lens element 2 | Object-side surface 25 | Aspheric | -10.122 | 0.437 | 3.486 | Plastics | 1.537 | 56.150 | -4.328 |
| | Image-side surface 26 | Aspheric | 3.060 | 0.922 | 2.228 | | | | |
| Third lens element 3 | Object-side surface 35 | Aspheric | 3.691 | 0.713 | 1.890 | Plastics | 1.647 | 22.418 | 89.510 |
| | Image-side surface 36 | Aspheric | 3.644 | 0.876 | 1.452 | | | | |
| Aperture stop 0 | | Spherical | Infinite | 0.180 | 1.236 | | | | |
| Fourth lens element 4 | Object-side surface 45 | Aspheric | -641.573 | 2.089 | 1.470 | Plastics | 1.537 | 56.150 | -1836.756 |
| | Image-side surface 46 | Aspheric | -1.639 | 0.010 | 1.784 | Cemented material | 1.537 | 56.150 | |
| Fifth lens element 5 | Object-side surface 55 | Aspheric | -1.639 | 0.707 | 1.787 | Plastics | 1.647 | 22.418 | 5.630 |
| | Image-side surface 56 | Aspheric | -2.718 | 0.234 | 2.238 | | | | |
| Sixth lens element 6 | Object-side surface 65 | Aspheric | 3.900 | 3.175 | 3.094 | Plastics | 1.537 | 56.150 | 9.798 |
| | Image-side surface 66 | Aspheric | 10.795 | 1.394 | 2.574 | | | | |
| Filter 9 | Object-side surface 95 | | Infinite | 0.700 | 2.722 | Glass | 1.518 | 64.166 | |
| | Image-side surface 96 | | Infinite | 1.400 | 2.817 | | | | |
| | Image plane 99 | | Infinite | | | | | | |

FIG. 16

| Surface | K | a2 | a4 | a6 | a8 |
|---|---|---|---|---|---|
| 25 | -4.057176E+01 | 0.000000E+00 | 6.107514E-03 | -3.615072E-04 | 1.585024E-05 |
| 26 | -1.843525E-01 | 0.000000E+00 | -1.950610E-03 | 3.450407E-04 | 1.068508E-04 |
| 35 | -1.090061E+01 | 0.000000E+00 | 1.724138E-02 | -1.057217E-02 | 2.814970E-03 |
| 36 | 3.976138E+00 | 0.000000E+00 | 1.072910E-02 | -4.582976E-03 | 2.275892E-03 |
| 45 | 0.000000E+00 | 0.000000E+00 | 1.173694E-02 | 1.054860E-03 | 1.755848E-04 |
| 46 | -1.000000E+00 | 0.000000E+00 | -2.154495E-02 | 3.447359E-03 | -5.248475E-03 |
| 55 | -1.000000E+00 | 0.000000E+00 | -2.154495E-02 | 3.447359E-03 | -5.248475E-03 |
| 56 | 0.000000E+00 | 0.000000E+00 | 1.238972E-03 | 7.293088E-04 | -4.437208E-04 |
| 65 | 0.000000E+00 | 0.000000E+00 | -4.626763E-04 | -2.790419E-04 | 8.054557E-05 |
| 66 | 0.000000E+00 | 0.000000E+00 | 7.092186E-03 | -3.672548E-04 | 2.018910E-04 |
| Surface | a10 | a12 | a14 | a16 | |
| 25 | -1.424307E-07 | -3.334085E-09 | 0.000000E+00 | 0.000000E+00 | |
| 26 | -1.746410E-05 | -1.096601E-06 | 0.000000E+00 | 0.000000E+00 | |
| 35 | -7.484487E-04 | 8.645845E-05 | 0.000000E+00 | 0.000000E+00 | |
| 36 | -8.493599E-04 | 0.000000E+00 | 0.000000E+00 | 0.000000E+00 | |
| 45 | 3.794482E-05 | -2.304203E-05 | 0.000000E+00 | 0.000000E+00 | |
| 46 | 1.700735E-03 | -2.509342E-04 | 2.093438E-05 | 0.000000E+00 | |
| 55 | 1.700735E-03 | -2.509342E-04 | 2.093438E-05 | 0.000000E+00 | |
| 56 | 2.168100E-04 | -4.118884E-05 | 3.740653E-06 | 0.000000E+00 | |
| 65 | -1.294983E-05 | 1.042459E-06 | -3.395365E-08 | 0.000000E+00 | |
| 66 | -3.778595E-05 | 3.830462E-06 | -1.060649E-07 | 0.000000E+00 | |

Longitudinal spherical aberration Field of view

-0.02 0 0.02
Focus(mm)

Field curvature (sagittal direction) Angle(°)

-0.02 0 0.02
Focus(mm)

Field curvature (tangential direction) Angle(°)

-0.02 0 0.02
Focus(mm)

Distortion Angle(°)

-8 0 8
Distortion rate (%)

| Fourth embodiment | | | | | | | | | |
|---|---|---|---|---|---|---|---|---|---|
| TTL=19.980 mm, EFL=3.558 mm, HFOV=33.000°, Image height=2.166 mm, Fno=1.850 | | | | | | | | | |
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 16.705 | 2.018 | 7.175 | Glass | 1.853 | 23.784 | 30.312 |
| | Image-side surface 16 | Spherical | 44.572 | 3.665 | 6.666 | | | | |
| Second lens element 2 | Object-side surface 25 | Aspheric | -7.682 | 0.435 | 3.057 | Plastics | 1.537 | 56.150 | -4.143 |
| | Image-side surface 26 | Aspheric | 3.192 | 1.243 | 2.149 | | | | |
| Third lens element 3 | Object-side surface 35 | Aspheric | 3.632 | 1.525 | 1.851 | Plastics | 1.647 | 22.418 | 331.708 |
| | Image-side surface 36 | Aspheric | 3.085 | 0.841 | 1.283 | | | | |
| Aperture stop 0 | | Spherical | Infinite | 0.140 | 1.176 | | | | |
| Fourth lens element 4 | Object-side surface 45 | Aspheric | 17.610 | 2.402 | 1.317 | Plastics | 1.537 | 56.150 | 50.417 |
| | Image-side surface 46 | Aspheric | -1.639 | 0.010 | 1.735 | Cemented material | 1.537 | 56.150 | |
| Fifth lens element 5 | Object-side surface 55 | Aspheric | -1.639 | 0.743 | 1.737 | Plastics | 1.647 | 22.418 | 5.865 |
| | Image-side surface 56 | Aspheric | -2.803 | 0.651 | 2.136 | | | | |
| Sixth lens element 6 | Object-side surface 65 | Aspheric | 3.614 | 3.172 | 2.699 | Plastics | 1.537 | 56.150 | 9.307 |
| | Image-side surface 66 | Aspheric | 9.064 | 1.037 | 2.159 | | | | |
| Filter 9 | Object-side surface 95 | | Infinite | 0.700 | 2.160 | Glass | 1.518 | 64.166 | |
| | Image-side surface 96 | | Infinite | 1.400 | 2.161 | | | | |
| | Image plane 99 | | Infinite | | | | | | |

FIG. 20

| Surface | K | a2 | a4 | a6 | a8 |
|---|---|---|---|---|---|
| 25 | -2.313620E+01 | 0.000000E+00 | 5.089880E-03 | -3.565266E-04 | 1.703677E-05 |
| 26 | -1.559450E-02 | 0.000000E+00 | 1.090856E-04 | 3.144090E-04 | 1.371565E-04 |
| 35 | -1.069024E+01 | 0.000000E+00 | 2.089731E-02 | -9.020614E-03 | 3.135498E-03 |
| 36 | 3.095404E+00 | 0.000000E+00 | 6.207514E-03 | -3.549787E-03 | 2.250271E-03 |
| 45 | 0.000000E+00 | 0.000000E+00 | 1.159166E-02 | 9.388474E-04 | 1.259155E-04 |
| 46 | -1.000000E+00 | 0.000000E+00 | -1.501112E-02 | 2.809208E-03 | -4.815494E-03 |
| 55 | -1.000000E+00 | 0.000000E+00 | -1.501112E-02 | 2.809208E-03 | -4.815494E-03 |
| 56 | 0.000000E+00 | 0.000000E+00 | 2.115145E-03 | 6.911410E-04 | -4.521139E-04 |
| 65 | 0.000000E+00 | 0.000000E+00 | -3.344928E-04 | -3.278544E-04 | 7.703652E-05 |
| 66 | 0.000000E+00 | 0.000000E+00 | 7.221975E-03 | -2.848147E-04 | 2.029974E-04 |
| Surface | a10 | a12 | a14 | a16 | |
| 25 | -3.358431E-07 | -1.021781E-08 | 0.000000E+00 | 0.000000E+00 | |
| 26 | -1.277461E-05 | 8.629192E-07 | 0.000000E+00 | 0.000000E+00 | |
| 35 | -7.197918E-04 | 6.903535E-05 | 0.000000E+00 | 0.000000E+00 | |
| 36 | -1.598817E-03 | 0.000000E+00 | 0.000000E+00 | 0.000000E+00 | |
| 45 | 8.504085E-05 | -3.140378E-05 | 0.000000E+00 | 0.000000E+00 | |
| 46 | 1.896922E-03 | -3.302375E-04 | 2.093438E-05 | 0.000000E+00 | |
| 55 | 1.896922E-03 | -3.302375E-04 | 2.093438E-05 | 0.000000E+00 | |
| 56 | 2.170319E-04 | -4.104848E-05 | 3.561043E-06 | 0.000000E+00 | |
| 65 | -1.248718E-05 | 1.117223E-06 | -3.983558E-08 | 0.000000E+00 | |
| 66 | -4.101041E-05 | 3.661759E-06 | 1.974496E-07 | 0.000000E+00 | |

FIG. 21

| Fifth embodiment |||||||||
|---|---|---|---|---|---|---|---|---|
| TTL=18.451 mm, EFL=3.940 mm, HFOV=33.000°, Image height=2.416 mm, Fno=1.850 |||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 31.301 | 1.623 | 3.538 | Glass | 1.760 | 27.579 | 13.618 |
| | Image-side surface 16 | Spherical | -15.120 | 0.010 | 2.923 | | | | |
| Second lens element 2 | Object-side surface 25 | Aspheric | -15.459 | 0.530 | 2.901 | Plastics | 1.537 | 56.150 | -3.054 |
| | Image-side surface 26 | Aspheric | 1.856 | 0.847 | 1.936 | | | | |
| Third lens element 3 | Object-side surface 35 | Aspheric | 2.752 | 0.834 | 1.853 | Plastics | 1.647 | 22.418 | 10.238 |
| | Image-side surface 36 | Aspheric | 4.144 | 1.143 | 1.549 | | | | |
| Aperture stop 0 | | Spherical | Infinite | 0.070 | 1.485 | | | | |
| Fourth lens element 4 | Object-side surface 45 | Aspheric | 46.817 | 2.258 | 1.544 | Plastics | 1.537 | 56.150 | 134.033 |
| | Image-side surface 46 | Aspheric | -1.639 | 0.010 | 1.709 | Cemented material | 1.537 | 56.150 | |
| Fifth lens element 5 | Object-side surface 55 | Aspheric | -1.639 | 0.937 | 1.710 | Plastics | 1.647 | 22.418 | 6.990 |
| | Image-side surface 56 | Aspheric | -3.193 | 3.744 | 2.136 | | | | |
| Sixth lens element 6 | Object-side surface 65 | Aspheric | 4.447 | 3.600 | 3.246 | Plastics | 1.537 | 56.150 | 8.345 |
| | Image-side surface 66 | Aspheric | 441.542 | 0.745 | 3.177 | | | | |
| Filter 9 | Object-side surface 95 | | Infinite | 0.700 | 2.950 | Glass | 1.518 | 64.166 | |
| | Image-side surface 96 | | Infinite | 1.400 | 2.820 | | | | |
| | Image plane 99 | | Infinite | | | | | | |

FIG. 24

| Surface | K | a2 | a4 | a6 | a8 |
|---|---|---|---|---|---|
| 25 | -1.656390E+02 | 0.000000E+00 | 2.561327E-03 | -6.236006E-04 | 2.037167E-05 |
| 26 | -5.001124E-01 | 0.000000E+00 | 3.000995E-03 | 1.260722E-03 | 1.159488E-03 |
| 35 | -5.000075E+00 | 0.000000E+00 | 3.556331E-02 | -2.351858E-03 | 3.883472E-03 |
| 36 | 5.304234E+00 | 0.000000E+00 | 1.695207E-02 | 5.916795E-03 | 8.074806E-04 |
| 45 | 0.000000E+00 | 0.000000E+00 | 1.110562E-02 | 1.289640E-03 | 1.181687E-04 |
| 46 | -1.000000E+00 | 0.000000E+00 | -1.909907E-02 | 2.898354E-03 | -4.502129E-03 |
| 55 | -1.000000E+00 | 0.000000E+00 | -1.909907E-02 | 2.898354E-03 | -4.502129E-03 |
| 56 | 0.000000E+00 | 0.000000E+00 | 1.430752E-03 | 7.134745E-04 | -4.686465E-04 |
| 65 | 0.000000E+00 | 0.000000E+00 | -4.602486E-05 | -3.835112E-04 | 8.169548E-05 |
| 66 | 0.000000E+00 | 0.000000E+00 | 6.139038E-03 | -9.628910E-04 | 1.869546E-04 |
| Surface | a10 | a12 | a14 | a16 | |
| 25 | 1.719501E-06 | -1.255050E-07 | 0.000000E+00 | 0.000000E+00 | |
| 26 | -3.470200E-04 | -5.016292E-06 | 0.000000E+00 | 0.000000E+00 | |
| 35 | -1.022082E-03 | 1.460217E-04 | 0.000000E+00 | 0.000000E+00 | |
| 36 | 6.321493E-04 | 0.000000E+00 | 0.000000E+00 | 0.000000E+00 | |
| 45 | 3.243658E-05 | -1.254611E-05 | 0.000000E+00 | 0.000000E+00 | |
| 46 | 1.790287E-03 | -3.041401E-04 | 1.423686E-05 | 0.000000E+00 | |
| 55 | 1.790287E-03 | -3.041401E-04 | 1.423686E-05 | 0.000000E+00 | |
| 56 | 2.164027E-04 | -4.150596E-05 | 3.311496E-06 | 0.000000E+00 | |
| 65 | -1.316589E-05 | 9.462031E-07 | -2.900244E-08 | 0.000000E+00 | |
| 66 | -4.056434E-05 | 3.596136E-06 | -1.106424E-07 | 0.000000E+00 | |

FIG. 25

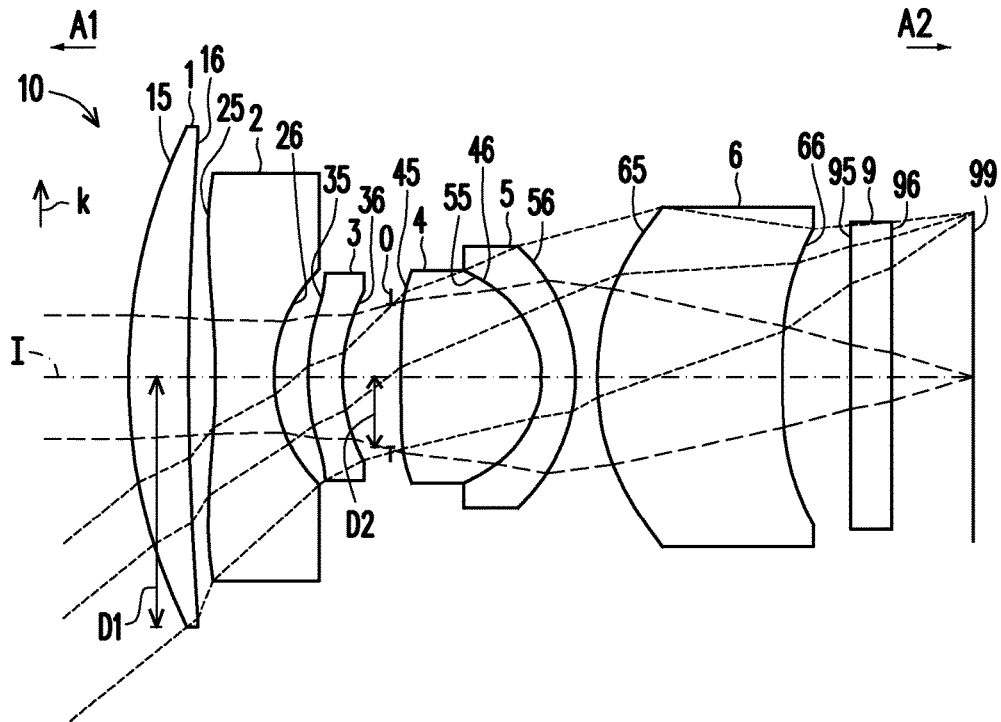
FIG. 26
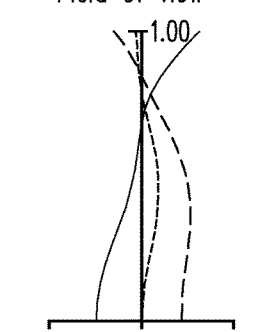
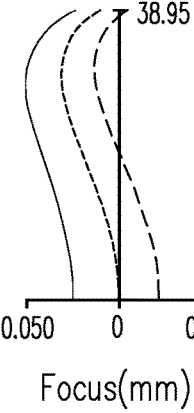
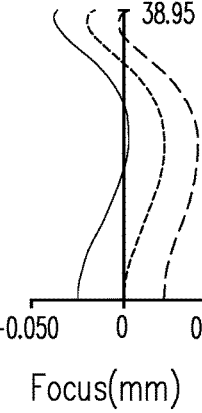
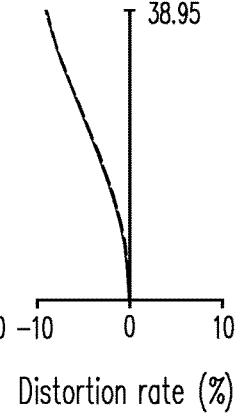
FIG. 27A    FIG. 27B    FIG. 27C    FIG. 27D

| Sixth embodiment |||||||||
|---|---|---|---|---|---|---|---|---|
| TTL=14.516 mm, EFL=3.805 mm, HFOV=38.950°, Image height=2.798 mm, Fno=1.850 |||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| Object |  |  | Infinite | Infinite |  |  |  |  |  |
| First lens element 1 | Object-side surface 15 | Spherical | 9.504 | 1.014 | 4.249 | Glass | 1.853 | 23.784 | 13.475 |
|  | Image-side surface 16 | Spherical | 52.173 | 0.484 | 4.134 |  |  |  |  |
| Second lens element 2 | Object-side surface 25 | Aspheric | -7.890 | 0.987 | 3.448 | Plastics | 1.537 | 56.150 | -3.541 |
|  | Image-side surface 26 | Aspheric | 2.613 | 0.599 | 1.813 |  |  |  |  |
| Third lens element 3 | Object-side surface 35 | Aspheric | 3.271 | 0.586 | 1.742 | Plastics | 1.647 | 22.418 | 31.241 |
|  | Image-side surface 36 | Aspheric | 3.627 | 0.830 | 1.446 |  |  |  |  |
| Aperture stop 0 |  | Spherical | Infinite | 0.172 | 1.214 |  |  |  |  |
| Fourth lens element 4 | Object-side surface 45 | Aspheric | 103.721 | 2.416 | 1.414 | Plastics | 1.537 | 56.150 | 296.942 |
|  | Image-side surface 46 | Aspheric | -1.639 | 0.010 | 1.792 | Cemented material | 1.537 | 56.150 |  |
| Fifth lens element 5 | Object-side surface 55 | Aspheric | -1.639 | 0.586 | 1.794 | Plastics | 1.647 | 22.418 | 5.712 |
|  | Image-side surface 56 | Aspheric | -2.734 | 0.371 | 2.216 |  |  |  |  |
| Sixth lens element 6 | Object-side surface 65 | Aspheric | 3.887 | 3.183 | 2.870 | Plastics | 1.537 | 56.150 | 10.066 |
|  | Image-side surface 66 | Aspheric | 9.886 | 1.179 | 2.496 |  |  |  |  |
| Filter 9 | Object-side surface 95 |  | Infinite | 0.700 | 2.570 | Glass | 1.518 | 64.166 |  |
|  | Image-side surface 96 |  | Infinite | 1.400 | 2.624 |  |  |  |  |
|  | Image plane 99 |  | Infinite |  |  |  |  |  |  |

FIG. 28

| Surface | K | a2 | a4 | a6 | a8 |
|---|---|---|---|---|---|
| 25 | -3.336607E+01 | 0.000000E+00 | 5.563960E-03 | -3.987519E-04 | 1.657006E-05 |
| 26 | 8.810412E-02 | 0.000000E+00 | -9.879418E-04 | 7.071844E-04 | 3.520831E-04 |
| 35 | -8.673456E+00 | 0.000000E+00 | 1.516553E-02 | -1.134931E-02 | 2.925412E-03 |
| 36 | 3.628834E+00 | 0.000000E+00 | 7.545582E-03 | -5.174642E-03 | 1.911311E-03 |
| 45 | 0.000000E+00 | 0.000000E+00 | 1.431018E-02 | 8.866089E-04 | 9.436631E-05 |
| 46 | -1.000000E+00 | 0.000000E+00 | -2.420262E-02 | 4.488516E-03 | -5.540848E-03 |
| 55 | -1.000000E+00 | 0.000000E+00 | -2.420262E-02 | 4.488516E-03 | -5.540848E-03 |
| 56 | 0.000000E+00 | 0.000000E+00 | 7.882799E-04 | 7.439146E-04 | -4.440323E-04 |
| 65 | 0.000000E+00 | 0.000000E+00 | -1.169929E-03 | -3.026974E-04 | 7.725258E-05 |
| 66 | 0.000000E+00 | 0.000000E+00 | 6.864672E-03 | -5.622491E-04 | 1.870336E-04 |
| Surface | a10 | a12 | a14 | a16 | |
| 25 | -2.545442E-07 | -3.617434E-09 | 0.000000E+00 | 0.000000E+00 | |
| 26 | -5.999252E-05 | 1.445071E-05 | 0.000000E+00 | 0.000000E+00 | |
| 35 | -6.771270E-04 | 7.777072E-05 | 0.000000E+00 | 0.000000E+00 | |
| 36 | -6.023127E-04 | 0.000000E+00 | 0.000000E+00 | 0.000000E+00 | |
| 45 | 2.845875E-05 | -1.428652E-05 | 0.000000E+00 | 0.000000E+00 | |
| 46 | 1.530442E-03 | -2.440825E-04 | 2.093404E-05 | 0.000000E+00 | |
| 55 | 1.530442E-03 | -2.440825E-04 | 2.093404E-05 | 0.000000E+00 | |
| 56 | 2.143782E-04 | -4.149676E-05 | 3.777346E-06 | 0.000000E+00 | |
| 65 | -1.315549E-05 | 1.047230E-06 | -3.172343E-08 | 0.000000E+00 | |
| 66 | -3.870081E-05 | 3.739003E-06 | -1.100574E-07 | 0.000000E+00 | |

FIG. 29

| Seventh embodiment ||||||||||
|---|---|---|---|---|---|---|---|---|---|
| TTL=20.000 mm, EFL=7.046 mm, HFOV=35.000°, Image height=4.881 mm, Fno=1.850 ||||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 20.097 | 1.541 | 6.386 | Glass | 1.853 | 23.784 | 23.563 |
| | Image-side surface 16 | Spherical | 116082.655 | 1.539 | 6.128 | | | | |
| Second lens element 2 | Object-side surface 25 | Aspheric | -18.100 | 0.220 | 3.665 | Plastics | 1.537 | 56.150 | -6.402 |
| | Image-side surface 26 | Aspheric | 4.260 | 1.218 | 2.626 | | | | |
| Third lens element 3 | Object-side surface 35 | Aspheric | 5.979 | 0.581 | 2.502 | Plastics | 1.647 | 22.418 | 52.240 |
| | Image-side surface 36 | Aspheric | 6.985 | 1.224 | 2.367 | | | | |
| Aperture stop 0 | | Spherical | Infinite | 0.105 | 2.334 | | | | |
| Fourth lens element 4 | Object-side surface 45 | Aspheric | -20.363 | 1.613 | 2.396 | Plastics | 1.537 | 56.150 | -58.298 |
| | Image-side surface 46 | Aspheric | -2.355 | 0.014 | 2.424 | Cemented material | 1.537 | 56.150 | |
| Fifth lens element 5 | Object-side surface 55 | Aspheric | -2.355 | 1.241 | 2.427 | Plastics | 1.647 | 22.418 | 9.408 |
| | Image-side surface 56 | Aspheric | -4.374 | 0.010 | 3.028 | | | | |
| Sixth lens element 6 | Object-side surface 65 | Aspheric | 4.827 | 4.905 | 3.867 | Plastics | 1.537 | 56.150 | 13.238 |
| | Image-side surface 66 | Aspheric | 9.707 | 2.771 | 3.250 | | | | |
| Filter 9 | Object-side surface 95 | | Infinite | 1.006 | 3.892 | Glass | 1.518 | 64.166 | |
| | Image-side surface 96 | | Infinite | 2.011 | 4.129 | | | | |
| | Image plane 99 | | Infinite | | | | | | |

FIG. 32

| Surface | K | $a_2$ | $a_4$ | $a_6$ | $a_8$ |
|---|---|---|---|---|---|
| 25 | -5.002695E+01 | 0.000000E+00 | 2.314173E-03 | -6.687045E-05 | -2.132092E-07 |
| 26 | 3.758194E-01 | 0.000000E+00 | 1.400954E-03 | 1.391040E-04 | 3.912330E-05 |
| 35 | -1.365547E+01 | 0.000000E+00 | 3.723542E-03 | -2.086342E-03 | 2.343119E-04 |
| 36 | 6.051591E+00 | 0.000000E+00 | -5.299894E-04 | -1.027701E-03 | 8.050093E-05 |
| 45 | 0.000000E+00 | 0.000000E+00 | 5.474056E-03 | 1.010205E-04 | 3.532458E-06 |
| 46 | -1.000000E+00 | 0.000000E+00 | -7.686275E-03 | 1.336107E-03 | -3.810828E-04 |
| 55 | -1.000000E+00 | 0.000000E+00 | -7.686275E-03 | 1.336107E-03 | -3.810828E-04 |
| 56 | 0.000000E+00 | 0.000000E+00 | 2.889284E-04 | 1.298431E-04 | -3.662305E-05 |
| 65 | 0.000000E+00 | 0.000000E+00 | -4.445236E-04 | -7.497783E-05 | 6.045511E-06 |
| 66 | 0.000000E+00 | 0.000000E+00 | 3.669732E-03 | 1.508599E-05 | 1.303288E-05 |
| Surface | $a_{10}$ | $a_{12}$ | $a_{14}$ | $a_{16}$ | |
| 25 | -4.857443E-08 | 4.522784E-09 | 0.000000E+00 | 0.000000E+00 | |
| 26 | -2.963909E-06 | 5.381335E-07 | 0.000000E+00 | 0.000000E+00 | |
| 35 | -2.076024E-05 | 7.247657E-07 | 0.000000E+00 | 0.000000E+00 | |
| 36 | -6.947286E-06 | 0.000000E+00 | 0.000000E+00 | 0.000000E+00 | |
| 45 | 1.044926E-06 | -2.148042E-07 | 0.000000E+00 | 0.000000E+00 | |
| 46 | 5.755202E-05 | -5.239587E-06 | 4.738108E-07 | 0.000000E+00 | |
| 55 | 5.755202E-05 | -5.239587E-06 | 4.738108E-07 | 0.000000E+00 | |
| 56 | 8.062182E-06 | -7.745927E-07 | 3.765512E-08 | 0.000000E+00 | |
| 65 | -4.914007E-07 | 1.887708E-08 | -4.509210E-10 | 0.000000E+00 | |
| 66 | -1.351689E-06 | 8.982212E-08 | -3.692720E-09 | 0.000000E+00 | |

FIG. 33

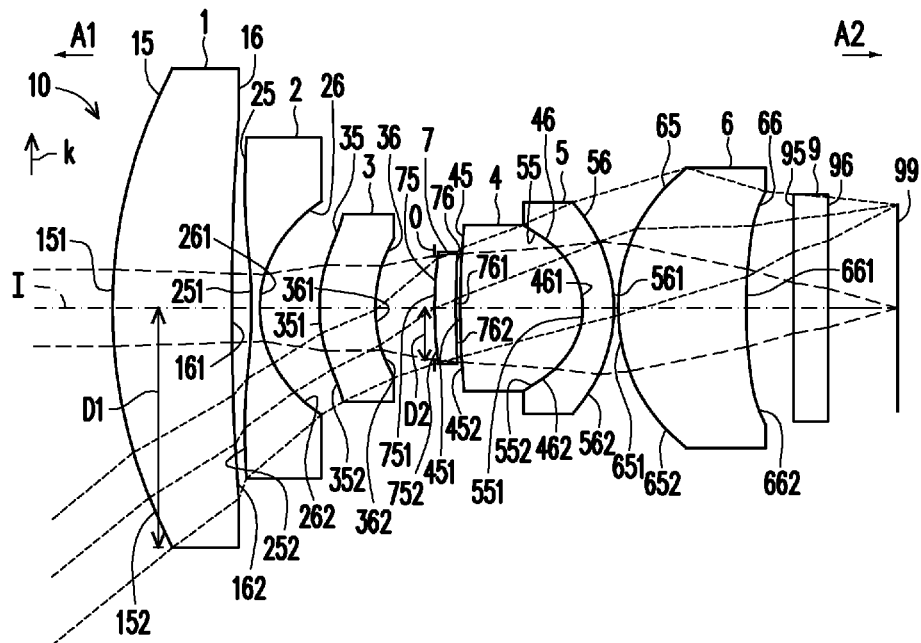
FIG. 34
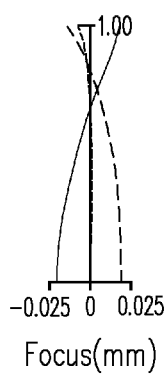
Longitudinal spherical aberration
Field of view
FIG. 35A
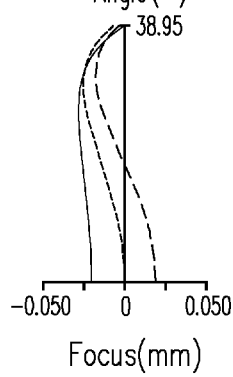
Field curvature (sagittal direction)
Angle (°)
FIG. 35B
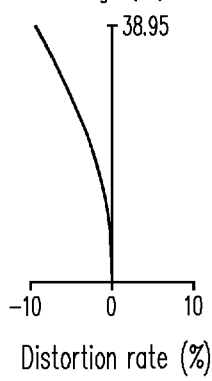
Field curvature (tangential direction)
Angle (°)
FIG. 35C
Distortion
Angle (°)
FIG. 35D

| Eighth embodiment |||||||||
|---|---|---|---|---|---|---|---|---|
| TTL=20.000 mm, EFL=3.623 mm, HFOV=38.950°, Image height=2.649 mm, Fno=1.850 |||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| Object |  |  | Infinite | Infinite |  |  |  |  |  |
| First lens element 1 | Object-side surface 15 | Spherical | 12.914 | 3.131 | 6.076 | Glass | 1.853 | 23.784 | 18.423 |
|  | Image-side surface 16 | Spherical | 148.513 | 0.398 | 4.923 |  |  |  |  |
| Second lens element 2 | Object-side surface 25 | Aspheric | -10.352 | 0.220 | 4.325 | Plastics | 1.537 | 56.150 | -4.089 |
|  | Image-side surface 26 | Aspheric | 2.806 | 1.530 | 2.715 |  |  |  |  |
| Third lens element 3 | Object-side surface 35 | Aspheric | 3.669 | 1.400 | 2.387 | Plastics | 1.647 | 22.418 | 27.764 |
|  | Image-side surface 36 | Aspheric | 3.919 | 1.536 | 1.769 |  |  |  |  |
| Aperture stop 0 |  | Spherical | Infinite | 0.010 | 1.322 |  |  |  |  |
| Seventh lens element 7 | Object-side surface 75 | Aspheric | 19.471 | 0.520 | 1.397 | Plastics | 1.647 | 22.418 | 473.062 |
|  | Image-side surface 76 | Spherical | 20.575 | 0.100 | 1.440 |  |  |  |  |
| Fourth lens element 4 | Object-side surface 45 | Spherical | 20.533 | 3.137 | 1.519 | Plastics | 1.537 | 56.150 | 58.783 |
|  | Image-side surface 46 | Aspheric | -2.049 | 0.013 | 2.125 | Cemented material | 1.537 | 56.150 |  |
| Fifth lens element 5 | Object-side surface 55 | Aspheric | -2.049 | 0.798 | 2.128 | Plastics | 1.647 | 22.418 | 7.694 |
|  | Image-side surface 56 | Aspheric | -3.612 | 0.096 | 2.681 |  |  |  |  |
| Sixth lens element 6 | Object-side surface 65 | Aspheric | 4.371 | 3.276 | 3.550 | Plastics | 1.537 | 56.150 | 10.152 |
|  | Image-side surface 66 | Aspheric | 16.303 | 1.213 | 2.961 |  |  |  |  |
| Filter 9 | Object-side surface 95 |  | Infinite | 0.875 | 2.888 | Glass | 1.518 | 64.166 |  |
|  | Image-side surface 96 |  | Infinite | 1.750 | 2.828 |  |  |  |  |
|  | Image plane 99 |  | Infinite |  |  |  |  |  |  |

FIG. 36

| Surface | K | a2 | a4 | a6 | a8 |
|---|---|---|---|---|---|
| 25 | -3.529703E+01 | 0.000000E+00 | 2.577368E-03 | -1.301963E-04 | 3.259991E-06 |
| 26 | -2.700298E-01 | 0.000000E+00 | -2.549725E-03 | -4.402123E-05 | 4.762483E-05 |
| 35 | -6.072316E+00 | 0.000000E+00 | 1.043246E-02 | -3.225425E-03 | 6.237138E-04 |
| 36 | 2.747949E+00 | 0.000000E+00 | 2.868916E-03 | -2.140700E-03 | 3.562682E-04 |
| 75 | 0.000000E+00 | 0.000000E+00 | 5.165426E-03 | 2.296948E-04 | -1.296424E-05 |
| 46 | -1.000000E+00 | 0.000000E+00 | -1.923109E-02 | 5.580622E-04 | -1.027131E-03 |
| 55 | -1.000000E+00 | 0.000000E+00 | -1.923109E-02 | 5.580622E-04 | -1.027131E-03 |
| 56 | 0.000000E+00 | 0.000000E+00 | -9.226257E-05 | 2.802507E-04 | -8.736389E-05 |
| 65 | 0.000000E+00 | 0.000000E+00 | -3.755125E-04 | -9.835459E-05 | 1.779278E-05 |
| 66 | 0.000000E+00 | 0.000000E+00 | 3.364552E-03 | -2.779883E-04 | 3.910667E-05 |
| Surface | a10 | a12 | a14 | a16 | |
| 25 | -2.035773E-08 | -6.899614E-10 | 0.000000E+00 | 0.000000E+00 | |
| 26 | -1.849764E-06 | -3.237395E-07 | 0.000000E+00 | 0.000000E+00 | |
| 35 | -1.002788E-04 | 6.962617E-06 | 0.000000E+00 | 0.000000E+00 | |
| 36 | -1.175892E-04 | 0.000000E+00 | 0.000000E+00 | 0.000000E+00 | |
| 75 | -5.456407E-06 | 3.085941E-06 | 0.000000E+00 | 0.000000E+00 | |
| 46 | 2.427916E-04 | -2.823551E-05 | 3.701122E-06 | 0.000000E+00 | |
| 55 | 2.427916E-04 | -2.823551E-05 | 3.701122E-06 | 0.000000E+00 | |
| 56 | 2.986907E-05 | -3.490123E-06 | 1.745178E-07 | 0.000000E+00 | |
| 65 | -1.674801E-06 | 9.244424E-08 | -1.883525E-09 | 0.000000E+00 | |
| 66 | -4.746160E-06 | 3.798313E-07 | 1.507098E-09 | 0.000000E+00 | |

FIG. 37

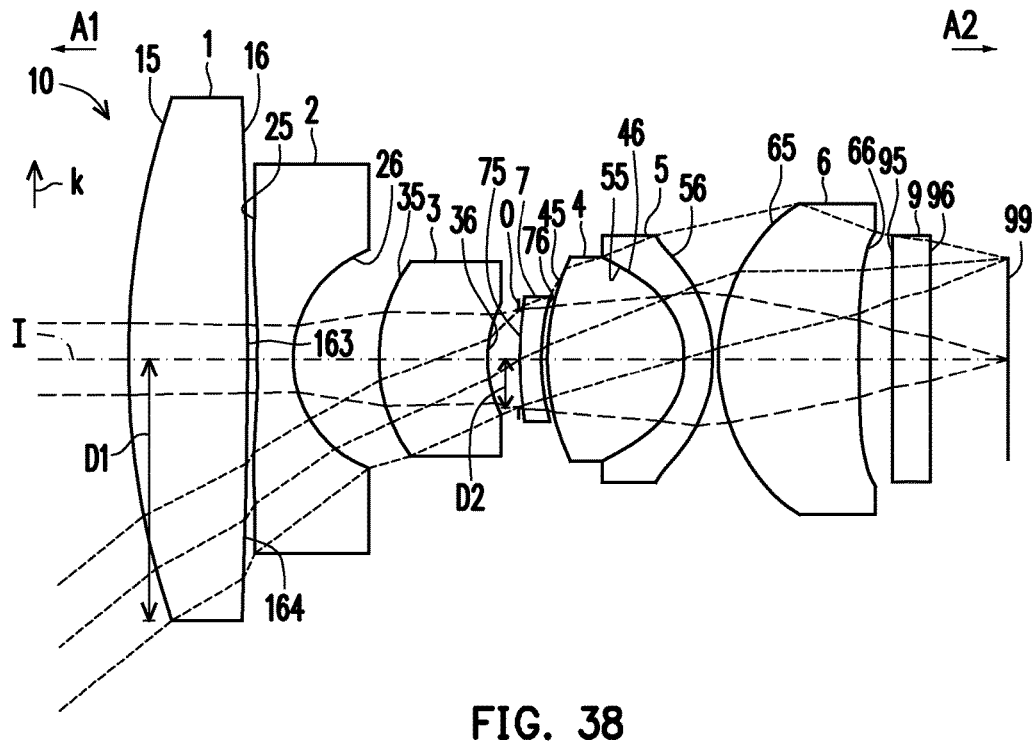
FIG. 38
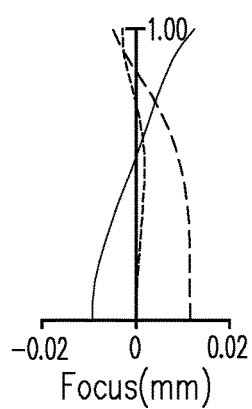
FIG. 39A
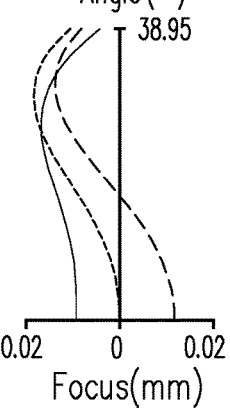
FIG. 39B
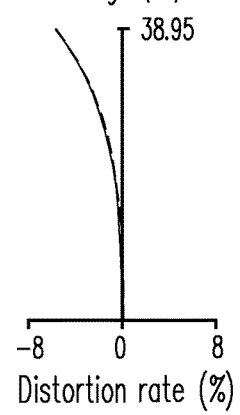
FIG. 39C
FIG. 39D

| Ninth embodiment | | | | | | | | | |
|---|---|---|---|---|---|---|---|---|---|
| TTL=20.000 mm, EFL=2.994 mm, HFOV=38.950°, Image height=2.279 mm, Fno=1.850 | | | | | | | | | |
| Element | Surface | Surface type | Radius of curvature (mm) | Thickness (mm) | Effective radius (mm) | Material | Refractive index (Nd) | Coefficient of dispersion (Vd) | Focal length (mm) |
| Object | | | Infinite | Infinite | | | | | |
| First lens element 1 | Object-side surface 15 | Spherical | 18.178 | 2.685 | 5.903 | Glass | 1.853 | 23.784 | 22.110 |
| | Image-side surface 16 | Spherical | -208.565 | 0.260 | 4.949 | | | | |
| Second lens element 2 | Object-side surface 25 | Aspheric | -17.783 | 0.791 | 4.382 | Plastics | 1.537 | 56.150 | -3.804 |
| | Image-side surface 26 | Aspheric | 2.343 | 1.942 | 2.463 | | | | |
| Third lens element 3 | Object-side surface 35 | Aspheric | 3.372 | 2.498 | 2.203 | Plastics | 1.647 | 22.418 | 20.036 |
| | Image-side surface 36 | Aspheric | 3.231 | 0.697 | 1.266 | | | | |
| Aperture stop 0 | | Spherical | Infinite | 0.010 | 1.105 | | | | |
| Seventh lens element 7 | Object-side surface 75 | Aspheric | 9.902 | 0.500 | 1.201 | Plastics | 1.647 | 22.418 | -15.358 |
| | Image-side surface 76 | Spherical | 4.862 | 0.145 | 1.422 | | | | |
| Fourth lens element 4 | Object-side surface 45 | Spherical | 5.338 | 3.103 | 2.027 | Plastics | 1.537 | 56.150 | 15.282 |
| | Image-side surface 46 | Aspheric | -2.049 | 0.013 | 2.298 | Cemented material | 1.537 | 56.150 | |
| Fifth lens element 5 | Object-side surface 55 | Aspheric | -2.049 | 0.644 | 2.301 | Plastics | 1.647 | 22.418 | 6.592 |
| | Image-side surface 56 | Aspheric | -3.214 | 0.146 | 2.774 | | | | |
| Sixth lens element 6 | Object-side surface 65 | Aspheric | 4.205 | 3.175 | 3.506 | Plastics | 1.537 | 56.150 | 8.766 |
| | Image-side surface 66 | Aspheric | 29.136 | 0.766 | 2.880 | | | | |
| Filter 9 | Object-side surface 95 | | Infinite | 0.875 | 2.792 | Glass | 1.518 | 64.166 | |
| | Image-side surface 96 | | Infinite | 1.750 | 2.666 | | | | |
| | Image plane 99 | | Infinite | | | | | | |

FIG. 40

| Surface | K | a2 | a4 | a6 | a8 |
|---|---|---|---|---|---|
| 25 | -8.375456E+01 | 0.000000E+00 | 2.231889E-03 | -1.341259E-04 | 3.270896E-06 |
| 26 | -2.394421E-01 | 0.000000E+00 | -3.355466E-03 | 1.328691E-04 | 6.613083E-05 |
| 35 | -5.585875E+00 | 0.000000E+00 | 1.279222E-02 | -2.596110E-03 | 6.850286E-04 |
| 36 | 2.066770E+00 | 0.000000E+00 | -1.547300E-03 | 9.582385E-05 | 1.041741E-03 |
| 75 | 0.000000E+00 | 0.000000E+00 | 4.719859E-03 | 1.160542E-03 | 3.546000E-04 |
| 46 | -1.000000E+00 | 0.000000E+00 | -1.661614E-02 | 6.896446E-04 | -1.029952E-03 |
| 55 | -1.000000E+00 | 0.000000E+00 | -1.661614E-02 | 6.896446E-04 | -1.029952E-03 |
| 56 | 0.000000E+00 | 0.000000E+00 | 8.231448E-05 | 3.215105E-04 | -8.917965E-05 |
| 65 | 0.000000E+00 | 0.000000E+00 | -6.533004E-04 | -9.253817E-05 | 1.938793E-05 |
| 66 | 0.000000E+00 | 0.000000E+00 | 0.000000E+00 | -6.533000E-04 | -9.250000E-05 |
| Surface | a10 | a12 | a14 | a16 | |
| 25 | -1.810340E-08 | -3.790869E-10 | 0.000000E+00 | 0.000000E+00 | |
| 26 | -5.460722E-06 | -1.090171E-06 | 0.000000E+00 | 0.000000E+00 | |
| 35 | -9.978169E-05 | 6.960514E-06 | 0.000000E+00 | 0.000000E+00 | |
| 36 | -1.787194E-04 | 0.000000E+00 | 0.000000E+00 | 0.000000E+00 | |
| 75 | 6.317019E-05 | -3.495977E-05 | 0.000000E+00 | 0.000000E+00 | |
| 46 | 2.176537E-04 | -3.807497E-05 | 4.503808E-06 | 0.000000E+00 | |
| 55 | 2.176537E-04 | -3.807497E-05 | 4.503808E-06 | 0.000000E+00 | |
| 56 | 2.983033E-05 | -3.329412E-06 | 2.096066E-07 | 0.000000E+00 | |
| 65 | -1.606053E-06 | 9.325217E-08 | -1.897146E-09 | 0.000000E+00 | |
| 66 | 1.940000E-05 | -1.610000E-06 | 9.330000E-08 | -1.900000E-09 | |

FIG. 41

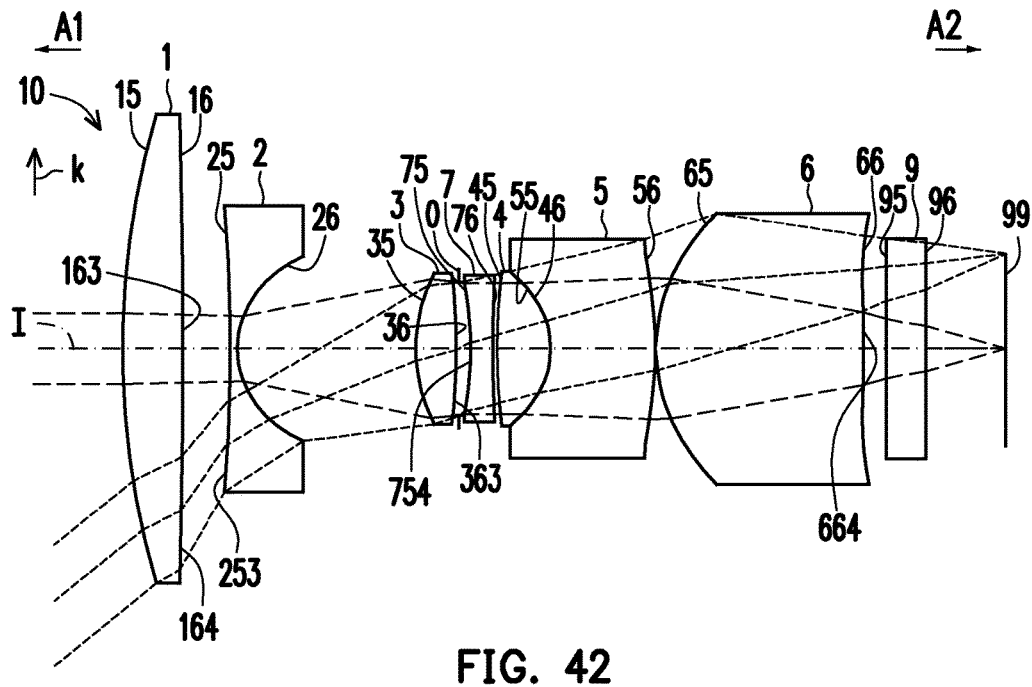
FIG. 42
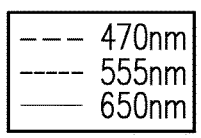
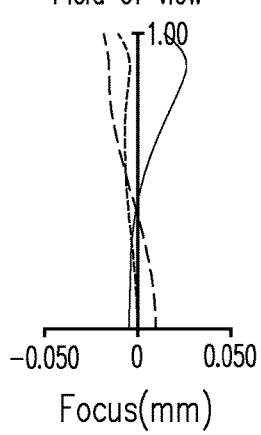
Longitudinal
spherical aberration
Field of view
−0.050  0  0.050
Focus(mm)
FIG. 43A
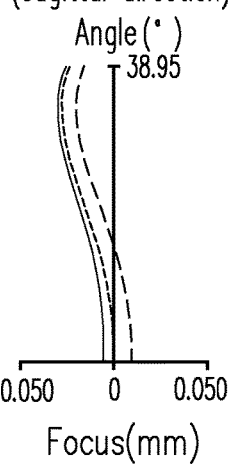
Field curvature
(sagittal direction)
Angle (°)
−0.050  0  0.050
Focus(mm)
FIG. 43B
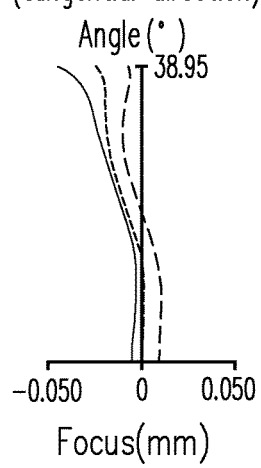
Field curvature
(tangential direction)
Angle (°)
−0.050  0  0.050
Focus(mm)
FIG. 43C
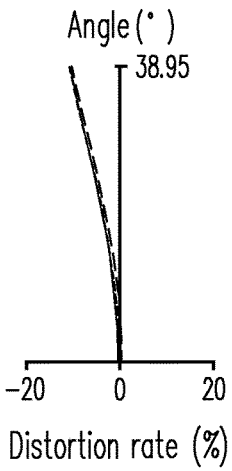
Distortion
Angle (°)
−20  0  20
Distortion rate (%)
FIG. 43D

| Tenth embodiment ||||||||||
| --- ||||||||||
| TTL=19.436 mm, EFL=2.875 mm, HFOV=38.950°, Image height=2.078 mm, Fno=1.850 ||||||||||
| Element | Surface | Surface type | Radius of curvature (mm) | Thickness (mm) | Effective radius (mm) | Material | Refractive index (Nd) | Coefficient of dispersion (Vd) | Focal length (mm) |
| --- | --- | --- | --- | --- | --- | --- | --- | --- | --- |
| Object | | | Infinite | Infinite | | | | | |
| First lens element 1 | Object-side surface 15 | Spherical | 18.499 | 1.263 | 5.153 | Glass | 1.853 | 23.784 | 23.211 |
| | Image-side surface 16 | Spherical | -370.103 | 1.045 | 4.878 | | | | |
| Second lens element 2 | Object-side surface 25 | Aspheric | -37.735 | 0.220 | 3.140 | Plastics | 1.537 | 56.150 | -3.444 |
| | Image-side surface 26 | Aspheric | 1.948 | 3.920 | 2.012 | | | | |
| Third lens element 3 | Object-side surface 35 | Aspheric | 3.825 | 0.848 | 1.647 | Plastics | 1.647 | 22.418 | 5.935 |
| | Image-side surface 36 | Aspheric | 789.931 | 0.101 | 1.507 | | | | |
| Aperture stop 0 | | Spherical | Infinite | 0.246 | 1.450 | | | | |
| Seventh lens element 7 | Object-side surface 75 | Aspheric | -7.315 | 0.500 | 1.470 | Plastics | 1.647 | 22.418 | -9.557 |
| | Image-side surface 76 | Spherical | 41.190 | 0.100 | 1.603 | | | | |
| Fourth lens element 4 | Object-side surface 45 | Spherical | 14.055 | 1.171 | 1.666 | Plastics | 1.537 | 56.150 | 40.239 |
| | Image-side surface 46 | Aspheric | -2.049 | 0.013 | 1.699 | Cemented material | 1.537 | 56.150 | |
| Fifth lens element 5 | Object-side surface 55 | Aspheric | -2.049 | 2.303 | 1.701 | Plastics | 1.647 | 22.418 | 28.412 |
| | Image-side surface 56 | Aspheric | -7.810 | 0.010 | 2.390 | | | | |
| Sixth lens element 6 | Object-side surface 65 | Aspheric | 3.543 | 4.572 | 2.963 | Plastics | 1.537 | 56.150 | 6.225 |
| | Image-side surface 66 | Aspheric | -32.298 | 0.502 | 2.472 | | | | |
| Filter 9 | Object-side surface 95 | | Infinite | 0.875 | 2.405 | Glass | 1.518 | 64.166 | |
| | Image-side surface 96 | | Infinite | 1.750 | 2.322 | | | | |
| | Image plane 99 | | Infinite | | | | | | |

FIG. 44

| Surface | K | a2 | a4 | a6 | a8 |
|---|---|---|---|---|---|
| 25 | 8.252773E+01 | 0.000000E+00 | 2.058671E-03 | -1.535940E-04 | 4.000535E-06 |
| 26 | -2.195053E-01 | 0.000000E+00 | 1.839732E-04 | -3.690754E-04 | 1.429276E-04 |
| 35 | -5.291268E+00 | 0.000000E+00 | 1.254634E-02 | -2.096575E-03 | 8.778154E-04 |
| 36 | -1.749301E+04 | 0.000000E+00 | 2.867670E-04 | -1.455885E-03 | 6.074573E-04 |
| 75 | 0.000000E+00 | 0.000000E+00 | 7.229787E-03 | -8.513599E-04 | -2.653348E-04 |
| 46 | -1.000000E+00 | 0.000000E+00 | -3.422876E-02 | 5.789517E-04 | -3.065070E-04 |
| 55 | -1.000000E+00 | 0.000000E+00 | -3.422876E-02 | 5.789517E-04 | -3.065070E-04 |
| 56 | 0.000000E+00 | 0.000000E+00 | 1.926835E-03 | 4.304863E-04 | -7.784254E-05 |
| 65 | 0.000000E+00 | 0.000000E+00 | -1.689615E-03 | -1.649461E-04 | 1.406084E-05 |
| 66 | 0.000000E+00 | 0.000000E+00 | 3.529657E-03 | -2.514554E-04 | 5.485692E-05 |
| Surface | a10 | a12 | a14 | a16 | |
| 25 | -9.982470E-08 | 1.506408E-08 | 0.000000E+00 | 0.000000E+00 | |
| 26 | 1.014464E-05 | -1.048728E-05 | 0.000000E+00 | 0.000000E+00 | |
| 35 | -5.442741E-05 | 2.011462E-05 | 0.000000E+00 | 0.000000E+00 | |
| 36 | -5.249982E-05 | 0.000000E+00 | 0.000000E+00 | 0.000000E+00 | |
| 75 | -3.981167E-05 | -4.322923E-05 | 0.000000E+00 | 0.000000E+00 | |
| 46 | 5.810369E-04 | 4.128406E-05 | -2.166119E-05 | 0.000000E+00 | |
| 55 | 5.810369E-04 | 4.128406E-05 | -2.166119E-05 | 0.000000E+00 | |
| 56 | 2.943836E-05 | -3.761811E-06 | 1.260639E-07 | 0.000000E+00 | |
| 65 | -1.966660E-06 | 5.822941E-08 | -6.894525E-09 | 0.000000E+00 | |
| 66 | -2.893357E-06 | 3.844479E-07 | -4.570536E-08 | 0.000000E+00 | |

FIG. 45

| Condition | First embodiment | Second embodiment | Third embodiment | Fourth embodiment | Fifth embodiment | Sixth embodiment | Seventh embodiment |
|---|---|---|---|---|---|---|---|
| T1 | 2.024 | 2.000 | 4.968 | 2.018 | 1.623 | 1.014 | 1.541 |
| G12 | 0.807 | 0.100 | 2.198 | 3.665 | 0.010 | 0.484 | 1.539 |
| T2 | 0.300 | 0.308 | 0.437 | 0.435 | 0.530 | 0.987 | 0.220 |
| G23 | 1.142 | 1.951 | 0.922 | 1.243 | 0.847 | 0.599 | 1.218 |
| T3 | 0.511 | 1.005 | 0.713 | 1.525 | 0.834 | 0.586 | 0.581 |
| G34 | 1.299 | 1.314 | 1.056 | 0.980 | 1.213 | 1.002 | 1.329 |
| T4 | 2.837 | 2.298 | 2.089 | 2.402 | 2.258 | 2.416 | 1.613 |
| G45 | 0.010 | 0.010 | 0.010 | 0.010 | 0.010 | 0.010 | 0.014 |
| T5 | 0.427 | 0.200 | 0.707 | 0.743 | 0.937 | 0.586 | 1.241 |
| G56 | 0.338 | 0.658 | 0.234 | 0.651 | 3.744 | 0.371 | 0.010 |
| T6 | 3.092 | 2.574 | 3.175 | 3.172 | 3.600 | 3.183 | 4.905 |
| G6F | 0.705 | 1.696 | 1.394 | 1.037 | 0.745 | 1.179 | 2.771 |
| TF | 0.700 | 0.700 | 0.700 | 0.700 | 0.700 | 0.700 | 1.006 |
| GFP | 1.400 | 1.400 | 1.400 | 1.400 | 1.400 | 1.400 | 2.011 |
| D1 | 5.406 | 3.203 | 8.885 | 7.175 | 3.538 | 4.249 | 6.386 |
| D2 | 1.107 | 1.602 | 1.236 | 1.176 | 1.485 | 1.214 | 2.334 |
| HFOV | 45.000 | 32.000 | 38.950 | 33.000 | 33.000 | 38.950 | 35.000 |
| EFL | 3.297 | 2.926 | 4.137 | 3.558 | 3.940 | 3.805 | 7.046 |
| TL | 12.787 | 12.418 | 16.506 | 16.844 | 15.606 | 11.237 | 14.212 |
| BFL | 2.805 | 3.796 | 3.494 | 3.137 | 2.845 | 3.279 | 5.788 |
| ALT | 9.191 | 8.385 | 12.087 | 10.294 | 9.782 | 8.771 | 10.102 |
| AAG | 3.596 | 4.033 | 4.420 | 6.550 | 5.824 | 2.465 | 4.110 |
| TTL | 15.592 | 16.214 | 20.000 | 19.980 | 18.451 | 14.516 | 20.000 |
| HFOV | 45.000 | 32.000 | 38.950 | 33.000 | 33.000 | 38.950 | 35.000 |

FIG. 46

| Condition | First embodi-ment | Second embodi-ment | Third embodi-ment | Fourth embodi-ment | Fifth embodi-ment | Sixth embodi-ment | Seventh embodi-ment |
|---|---|---|---|---|---|---|---|
| D1/D2 | 4.883 | 2.000 | 7.191 | 6.102 | 2.383 | 3.501 | 2.737 |
| TTL/T6 | 5.043 | 6.300 | 6.300 | 6.300 | 5.125 | 4.560 | 4.078 |
| TTL/(T4+T6) | 2.630 | 3.329 | 3.800 | 3.585 | 3.150 | 2.593 | 3.069 |
| TTL/(T1+T6) | 3.048 | 3.545 | 2.456 | 3.850 | 3.533 | 3.458 | 3.103 |
| TTL/(T1+G12+T2+G23+T3) | 3.259 | 3.022 | 2.165 | 2.248 | 4.800 | 3.955 | 3.922 |
| TL/(T1+G12+G45+G56) | 4.023 | 4.485 | 2.228 | 2.655 | 2.897 | 5.979 | 4.577 |
| TL/(T1+T2+T3) | 4.510 | 3.748 | 2.698 | 4.234 | 5.225 | 4.343 | 6.066 |
| ALT/(G12+G34) | 4.365 | 5.929 | 3.714 | 2.216 | 8.000 | 5.903 | 3.522 |
| ALT/(T2+G23) | 6.373 | 3.712 | 8.900 | 6.133 | 7.103 | 5.532 | 7.027 |
| AAG/(T5+G56) | 4.700 | 4.700 | 4.700 | 4.700 | 1.244 | 2.578 | 3.285 |
| AAG/(T3+G45) | 6.900 | 3.973 | 6.117 | 4.268 | 6.900 | 4.139 | 6.900 |
| (T1+T2+T3)/(G12+G34) | 1.346 | 2.343 | 1.880 | 0.856 | 2.443 | 1.741 | 0.817 |
| (G12+T3+T5+T6)/(T1+G23) | 1.528 | 0.982 | 1.153 | 2.791 | 2.178 | 3.000 | 2.996 |
| EFL/(T1+T2) | 1.419 | 1.268 | 0.765 | 1.450 | 1.830 | 1.901 | 4.000 |
| EFL/(G12+G45+G56) | 2.856 | 3.807 | 1.694 | 0.822 | 1.047 | 4.399 | 4.506 |
| TTL/(T1+G23) | 4.925 | 4.104 | 3.396 | 6.126 | 7.470 | 9.000 | 7.249 |
| (T3+G34+T4)/(T1+T2) | 2.000 | 2.000 | 0.714 | 2.000 | 2.000 | 2.000 | 2.000 |
| BFL/(G12+G23) | 1.440 | 1.851 | 1.120 | 0.639 | 3.319 | 3.028 | 2.099 |
| (T6+BFL)/(G34+G45+G56) | 3.581 | 3.214 | 5.130 | 3.845 | 1.298 | 4.674 | 7.901 |
| (AAG+BFL)/(T2+T3+T4) | 1.754 | 2.168 | 2.444 | 2.221 | 2.393 | 1.440 | 4.100 |
| (ALT+BFL)/(G12+G23+G34) | 3.694 | 3.620 | 3.731 | 2.281 | 6.100 | 5.781 | 3.889 |

| Condition | Eighth embodiment | Ninth embodiment | Tenth embodiment |
|---|---|---|---|
| T1 | 3.131 | 2.685 | 1.263 |
| G12 | 0.398 | 0.260 | 1.045 |
| T2 | 0.220 | 0.791 | 0.220 |
| G23 | 1.530 | 1.942 | 3.920 |
| T3 | 1.400 | 2.498 | 0.848 |
| G37 | 1.546 | 0.707 | 0.346 |
| T7 | 0.520 | 0.500 | 0.500 |
| G74 | 0.100 | 0.145 | 0.100 |
| T4 | 3.137 | 3.103 | 1.171 |
| G45 | 0.013 | 0.013 | 0.013 |
| T5 | 0.798 | 0.644 | 2.303 |
| G56 | 0.096 | 0.146 | 0.010 |
| T6 | 3.276 | 3.175 | 4.572 |
| G6F | 1.213 | 0.766 | 0.502 |
| TF | 0.875 | 0.875 | 0.875 |
| GFP | 1.750 | 1.750 | 1.750 |
| G34 | 2.166 | 1.352 | 0.946 |
| D1 | 6.076 | 5.903 | 5.153 |
| D2 | 1.322 | 1.105 | 1.450 |
| HFOV | 38.950 | 38.950 | 38.950 |
| EFL | 3.623 | 2.994 | 2.875 |
| TL | 16.162 | 16.609 | 16.310 |
| BFL | 3.838 | 3.391 | 3.127 |
| ALT | 12.480 | 13.396 | 10.875 |
| AAG | 4.202 | 3.713 | 5.934 |
| TTL | 20.000 | 20.000 | 19.436 |
| HFOV | 38.950 | 38.950 | 38.950 |

| Condition | Eighth embodiment | Ninth embodiment | Tenth embodiment |
|---|---|---|---|
| D1/D2 | 4.594 | 5.344 | 3.554 |
| TTL/T6 | 6.106 | 6.300 | 4.252 |
| TTL/(T4+T6) | 3.119 | 3.186 | 3.385 |
| TTL/(T1+T6) | 3.122 | 3.413 | 3.331 |
| TTL/(T1+G12+T2+G23+T3) | 2.995 | 2.446 | 2.664 |
| TL/(T1+G12+G45+G56) | 4.443 | 5.351 | 7.000 |
| TL/(T1+T2+T3) | 3.402 | 2.780 | 7.000 |
| ALT/(G12+G34) | 4.869 | 8.310 | 5.461 |
| ALT/(T2+G23) | 7.133 | 4.901 | 2.627 |
| AAG/(T5+G56) | 4.700 | 4.700 | 2.566 |
| AAG/(T3+G45) | 2.975 | 1.479 | 6.900 |
| (T1+T2+T3)/(G12+G34) | 1.853 | 3.706 | 1.170 |
| (G12+T3+T5+T6)/(T1+G23) | 1.260 | 1.421 | 1.692 |
| EFL/(T1+T2) | 1.081 | 0.861 | 1.939 |
| EFL/(G12+G45+G56) | 7.153 | 7.153 | 2.693 |
| TTL/(T1+G23) | 4.291 | 4.322 | 3.750 |
| (T3+G34+T4)/(T1+T2) | 2.000 | 2.000 | 2.000 |
| BFL/(G12+G23) | 1.991 | 1.540 | 0.630 |
| (T6+BFL)/(G34+G45+G56) | 3.128 | 4.346 | 7.947 |
| (AAG+BFL)/(T2+T3+T4) | 1.690 | 1.111 | 4.048 |
| (ALT+BFL)/(G12+G23+G34) | 3.987 | 4.723 | 2.368 |

FIG. 49

OPTICAL IMAGING LENS

CROSS-REFERENCE TO RELATED APPLICATION

This application claims the priority benefit of Chinese application serial no. 201810035609.0, filed on Jan. 15, 2018. The entirety of the above-mentioned patent application is hereby incorporated by reference herein and made a part of this specification.

BACKGROUND OF THE INVENTION

1. Field of the Invention

The invention relates to an optical device, and particularly relates to an optical imaging lens.

2. Description of Related Art

As portable electronic products with novel specifications emerge one after another, the development of a crucial part, i.e., the optical imaging lens, is also diversified. There are more and more applications of optical lens assemblies in vehicle-related fields, such as car-backing systems, 360 degree panoramic systems, lane departure warning systems, rear surveillance systems, and advanced driver assistance systems (ADAS). One vehicle may include 6 to 20 optical lens assemblies, and the specifications of optical lens assemblies are constantly refined. Nevertheless, the imaging quality of optical lens assemblies for vehicles still falls behind the imaging quality of optical lens assemblies for mobile phones. How to facilitate the imaging quality of lenses for vehicles under the premise of maintaining a large aperture, a large field of view, and a short lens length has become a popular issue in the industry.

However, when designing an optical imaging lens, an optical lens having both a miniaturized size and a desirable imaging quality cannot be manufactured by simply scaling down a lens with a desirable imaging quality. Designing a miniaturized optical imaging lens not only involves material properties but also needs to take practical production issues, such as manufacturing and assembling yield rates, into consideration. Thus, the technical level of a miniaturized optical imaging lens is higher than that of a traditional optical imaging lens. How to manufacture a miniaturized optical imaging lens meeting the needs of consumer electronic products and facilitate the imaging quality of such optical imaging lens has been an issue of this field.

SUMMARY OF THE INVENTION

One or some exemplary embodiments of the invention provide an optical imaging lens having a desirable optical performance.

An embodiment of the invention provides an optical imaging lens sequentially including a first lens element, a second lens element, a third lens element, a fourth lens element, a fifth lens element, and a sixth lens element along an optical axis from an object side to an image side. Each of the lens elements has an object side surface facing toward the object side and allowing an imaging ray to pass through and an image side surface facing toward the image side and allowing the imaging ray to pass through. The optical imaging lens further includes an aperture stop between the object side and the image side. The first lens element is a lens element having refracting power in a first order from the object side to the image side. The second lens element is a lens element having refracting power in a second order from the object side to the image side, and the second lens element has negative refracting power. The third lens element is a lens element having refracting power in a third order from the object side to the image side. The fourth lens element is a lens element having refracting power in a third order from the image side to the object side, and a periphery region of the object side surface of the fourth lens element is convex. The fifth lens element is a lens element having refracting power in a second order from the image side to the object side, and a periphery region of the image side surface of the fifth lens element is convex. The sixth lens element is a lens element having refracting power in a first order from the image side to the object side. The optical imaging lens satisfies conditions as follows:

HFOV≤45°, wherein HFOV is a half field of view of the optical imaging lens;

2.000≤D1/D2, wherein D1 is an effective radius of the object side surface of the first lens element, and D2 is a radius of the aperture stop; and TTL/T6≤6.300, wherein TTL is a distance between the object side surface of the first lens element and an image plane of the optical imaging lens along the optical axis, and T6 is a thickness of the sixth lens element along the optical axis.

Based on the above, the optical imaging lens according to the embodiments of the invention is effective in terms of the following. By controlling the arrangement of the convex/concave curved surface of specific lens elements and the refracting power of specific lens elements and making the optical imaging lens satisfy the conditions of HFOV≤45°, 2.000≤D1/D2, and TTL/T6≤6.300, the optical imaging lens according to the embodiments of the invention is able to render a desirable optical performance under the condition of having a large field of view and a short system length.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 10 is a schematic diagram illustrating an optical imaging lens according to a second embodiment of the invention.

FIGS. 11A to 11D are diagrams illustrating a longitudinal spherical aberration and various aberrations of the optical imaging lens according to the second embodiment.

FIG. 12 shows detailed optical data of the optical imaging lens according to the second embodiment of the invention.

FIG. 13 shows aspheric parameters pertaining to the optical imaging lens according to the second embodiment of the invention.

FIG. 14 is a schematic diagram illustrating an optical imaging lens according to a third embodiment of the invention.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the invention.

FIG. 17 shows aspheric parameters pertaining to the optical imaging lens according to the third embodiment of the invention.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 26 is a schematic diagram illustrating an optical imaging lens according to a sixth embodiment of the invention.

FIGS. 27A to 27D are diagrams illustrating a longitudinal spherical aberration and various aberrations of the optical imaging lens according to the sixth embodiment.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 32 shows detailed optical data of the optical imaging lens according to the seventh embodiment of the invention.

FIG. 33 shows aspheric parameters pertaining to the optical imaging lens according to the seventh embodiment of the invention.

FIG. 34 is a schematic diagram illustrating an optical imaging lens according to an eighth embodiment of the invention.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the invention.

FIG. 37 shows aspheric parameters pertaining to the optical imaging lens according to the eighth embodiment of the invention.

FIG. 38 is a schematic diagram illustrating an optical imaging lens according to a ninth embodiment of the invention.

FIGS. 39A to 39D are diagrams illustrating a longitudinal spherical aberration and various aberrations of the optical imaging lens according to the ninth embodiment.

FIG. 40 shows detailed optical data of the optical imaging lens according to the ninth embodiment of the invention.

FIG. 41 shows aspheric parameters pertaining to the optical imaging lens according to the ninth embodiment of the invention.

FIG. 42 is a schematic diagram illustrating an optical imaging lens according to a tenth embodiment of the invention.

FIGS. 43A to 43D are diagrams illustrating a longitudinal spherical aberration and various aberrations of the optical imaging lens according to the tenth embodiment.

FIG. 44 shows detailed optical data of the optical imaging lens according to the tenth embodiment of the invention.

FIG. 45 shows aspheric parameters pertaining to the optical imaging lens according to the tenth embodiment of the invention.

FIGS. 46 and 47 shows values of respective important parameters and relations thereof of the optical lens assemblies according to the first to seventh embodiments of the invention.

FIGS. 48 and 49 shows values of respective important parameters and relations thereof of the optical lens assemblies according to the eighth to tenth embodiments of the invention.

DESCRIPTION OF THE EMBODIMENTS

Figure 1:
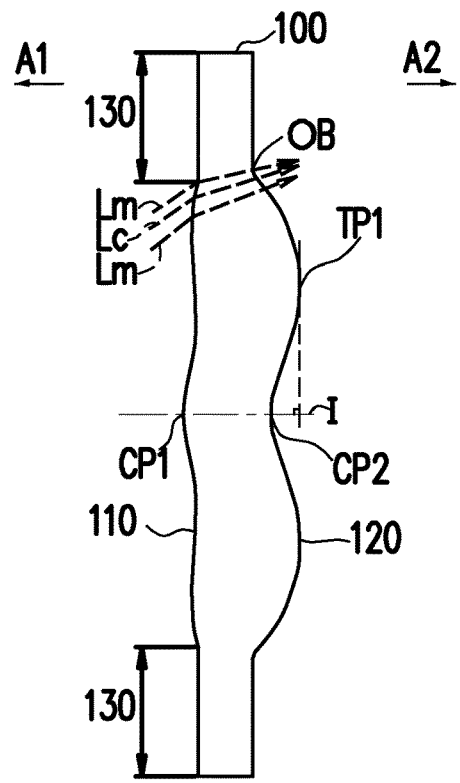
FIG. 1 is a schematic diagram illustrating a surface shape structure of a lens.

Reference will now be made in detail to the present preferred embodiments of the invention, examples of which are illustrated in the accompanying drawings. Wherever possible, the same reference numbers are used in the drawings and the description to refer to the same or like parts.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
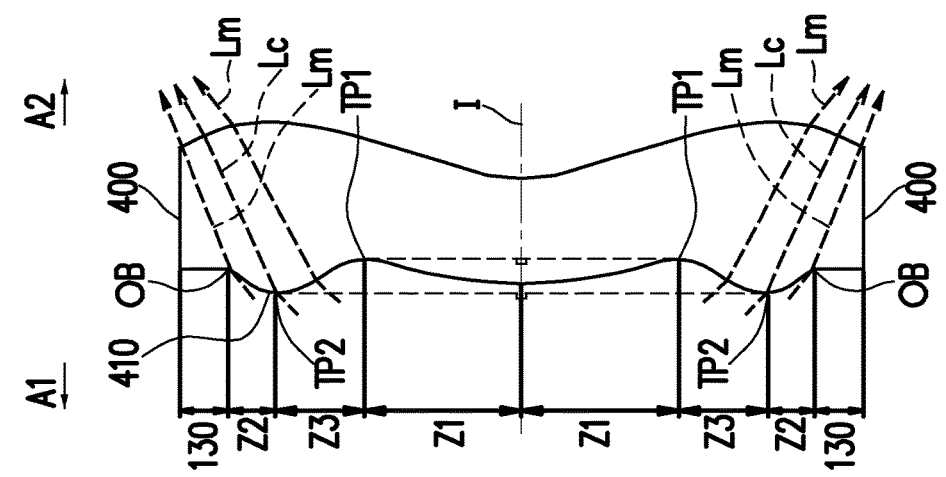
FIG. 4 is a schematic diagram illustrating a surface shape structure of a lens according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
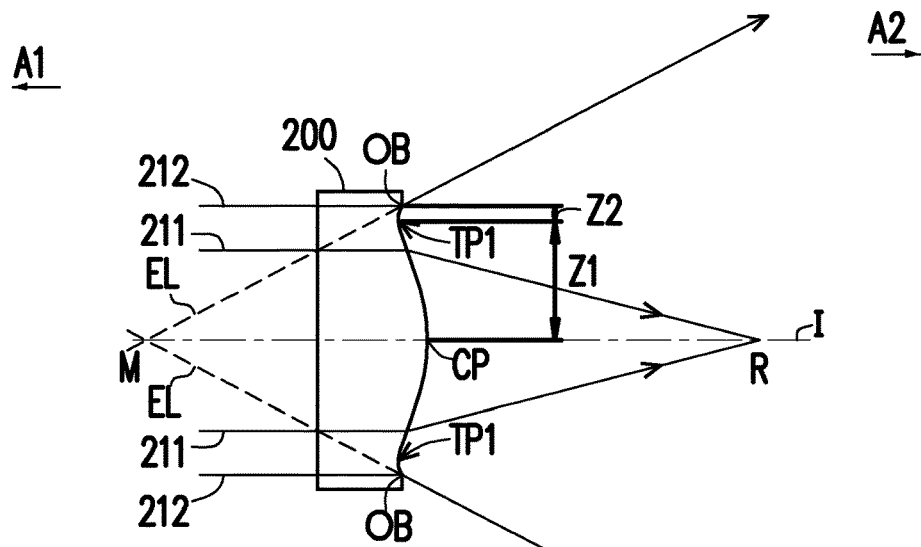
FIG. 2 is a schematic diagram illustrating surface shape concave and convex structures and a light focal point of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
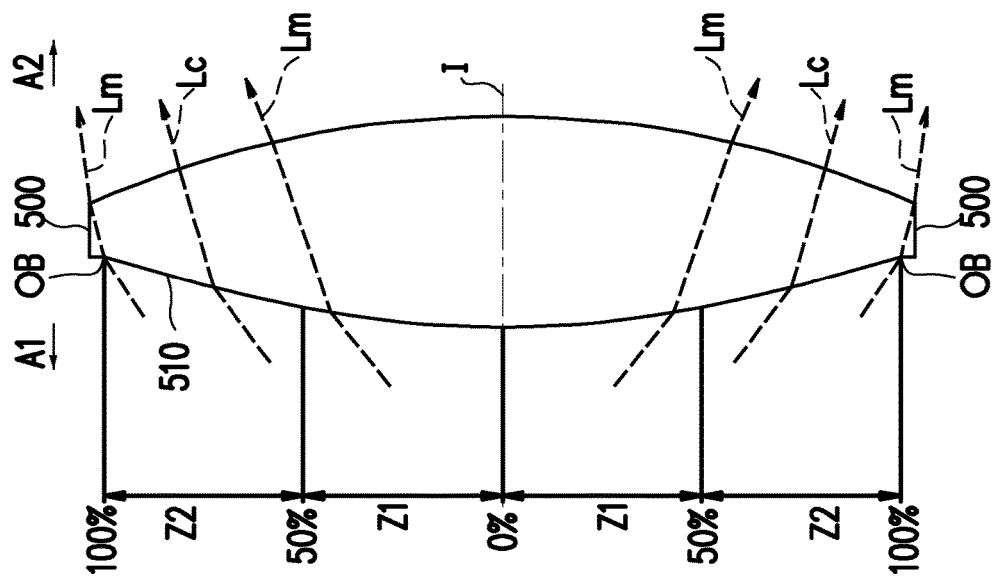
FIG. 5 is a schematic diagram illustrating a surface shape structure of a lens according to Example 3.
Figure 3:
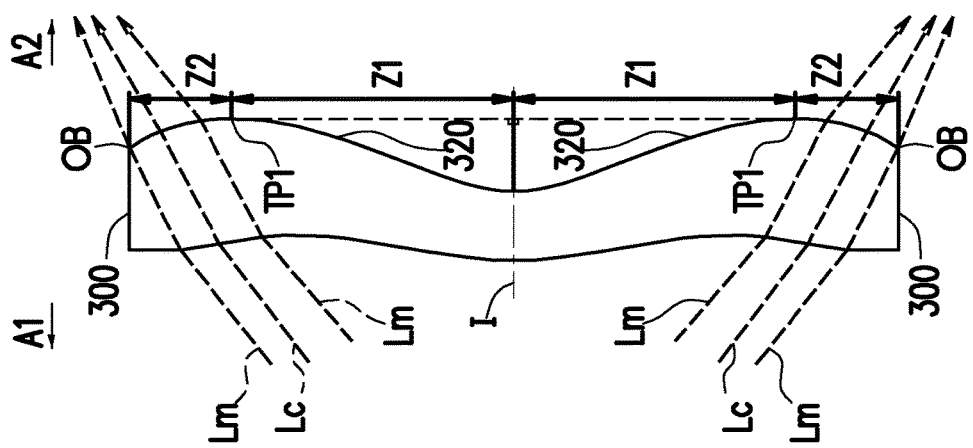
FIG. 3 is a schematic diagram illustrating a surface shape structure of a lens according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention, and FIGS. 7A to 7D are diagrams illustrating a longitudinal spherical aberration and various aberrations of the optical imaging lens according to the first embodiment. Referring to FIG. 6, from an object side A1 to an image side A2 along an optical axis I of an optical imaging lens 10 according to the first embodiment of the invention, the optical imaging lens 10 sequentially includes a first lens element 1, a second lens element 2, a third lens element 3, an aperture stop 0, a fourth lens element 4, a fifth lens element 5, a sixth lens element 6, and a filter 9. When a ray emitted from an object to be shot enters the optical imaging lens 10, an image may be formed on an image plane 99 after the ray sequentially passes through the first lens element 1, the second lens element 2, the third lens element 3, the aperture stop 0, the fourth lens element 4, the fifth lens element 5, the sixth lens element 6, and the filter 9. In addition, the object side A1 is a side facing toward the object to be shot, whereas the image side A2 is a side facing toward the image plane 99.

In the embodiment, the first lens element 1, the second lens element 2, the third lens element 3, the fourth lens element 4, the fifth lens element 5, the sixth lens element 6, and the filter 9 respectively have object side surfaces 15, 25, 35, 45, 55, 65, and 95 facing toward the object side A1 and allowing an imaging ray to pass through and image side surfaces 16, 26, 36, 46, 56, 66, and 96 facing toward the image side A2 and allowing the imaging ray to pass through.

The first lens element 1 has positive refracting power. An optical axis region 151 of the object side surface 15 of the first lens element 1 is convex and a periphery region 152 of the object side surface 15 of the first lens element 1 is convex. An optical axis region 161 of the image side surface 16 of the first lens element 1 is concave, and a periphery region 162 of the image side surface 16 of the first lens element 1 is concave. In the embodiment, a material of the first lens element 1 is glass. The object side surface 15 and the image side surface 16 of the first lens element 1 are spherical surfaces.

The second lens element 2 has negative refracting power. An optical axis region 251 of the object side surface 25 of the second lens element 2 is concave, and a periphery region 252 of the object side surface 25 of the second lens element 2 is convex. An optical axis region 261 of the image side surface 26 of the second lens element 2 is concave, and a periphery region 262 of the image side surface 26 of the second lens element 2 is concave. In the embodiment, a material of the second lens element 2 is plastic. The object side surface 25 and the image side surface 26 of the second lens element 2 are aspheric surfaces.

The third lens element 3 has negative refracting power. An optical axis region 351 of the object side surface 35 of the third lens element 3 is convex, and a periphery region 352 of the object side surface 35 of the third lens element 3 is convex. An optical axis region 361 of the image side surface 36 of the third lens element 3 is concave, and a periphery region 362 of the image side surface 36 of the third lens element 3 is concave. In the embodiment, a material of the third lens element 3 is plastic. The object side surface 35 and the image side surface 36 of the third lens element 3 are aspheric surfaces.

In the first embodiment, the aperture stop 0 is disposed between the third lens element 3 and the fourth lens element 4. The aperture stop 0 has a radius D2. The radius D2 of the aperture stop 0 refers to a distance between an optical boundary (i.e., a point where a radially outermost marginal ray passing through the aperture stop 0 intersects the aperture stop 0) of the aperture stop 0 and the optical axis I of the optical imaging lens 10 in a radial direction k. In addition, the radial direction k is perpendicular to the optical axis I.

The fourth lens element 4 has positive refracting power. An optical axis region 451 of the object side surface 45 of the fourth lens element 4 is convex, and a periphery region 452 of the object side surface 45 of the fourth lens element 4 is convex. An optical axis region 461 of the image side surface 46 of the fourth lens element 4 is convex, and a periphery region 462 of the image side surface 46 of the fourth lens element 4 is convex. In the embodiment, a material of the fourth lens element 4 is plastic. The object side surface 45 and the image side surface 46 of the fourth lens element 4 are aspheric surfaces.

The fifth lens element 5 has positive refracting power. An optical axis region 551 of the object side surface 55 of the fifth lens element 5 is concave, and a periphery region 552 of the object side surface 55 of the fifth lens element 5 is concave. An optical axis region 561 of the image side surface 56 of the fifth lens element 5 is convex, and a periphery region 562 of the image side surface 56 of the fifth lens element 5 is convex. In the embodiment, a material of the fifth lens element 5 is plastic. The object side surface 55 and the image side surface 56 of the fifth lens element 5 are aspheric surfaces.

In the embodiment, the image side surface 46 of the fourth lens element 4 and the object side surface 55 of the fifth lens element 5 are cemented by a cemented material. Therefore, instead of an air gap, the cemented material is provided between the image side surface 46 of the fourth lens element 4 and the object side surface 55 of the fifth lens element 5.

The sixth lens element 6 has positive refracting power. An optical axis region 651 of the object side surface 65 of the sixth lens element 6 is convex, and a periphery region 652 of the object side surface 65 of the sixth lens element 6 is convex. An optical axis region 661 of the image side surface 66 of the sixth lens element 6 is concave, and a periphery region 662 of the image side surface 66 of the sixth lens element 6 is concave. In the embodiment, a material of the sixth lens element 6 is plastic. The object side surface 65 and the image side surface 66 of the sixth lens element 6 are aspheric surfaces.

The filter 9 is disposed between the image side surface 62 of the sixth lens element 6 and the image plane 99. In the embodiment, the filter 9 is an IR cut filter, for example. The IR cut filter is capable of filtering out infrared light and allowing visible light to pass through. In the embodiment, a material of the filter 9 includes glass.

Lens elements having refracting power in the optical imaging lens 10 of the first embodiment are only six lens elements, i.e., the first lens element 1, the second lens element 2, the third lens element 3, the fourth lens element 4, the fifth lens element 5, and the sixth lens element 6.

Other detailed optical data of the first embodiment are as shown in FIG. 8. In addition, the system length (TTL) of the optical imaging lens 10 of the first embodiment is 15.592 mm, the effective focal length (EFL) of the optical imaging lens element 10 of the first embodiment is 3.297 mm, the half field of view (HFOV) thereof is 45.000, the image height thereof is 2.715 mm, and the f-number (Fno) thereof is 1.850. The system length refers to a distance on the optical axis I from the object side surface 15 of the first lens element 1 to the image plane 99. The effective focal length refers to a distance between an optical boundary of each element surface (i.e., a point where a radially outermost marginal ray passing through the element surface intersects the element surface) and the optical axis I in a radial direction k, wherein the radial direction k is perpendicular to the optical axis I. For example, as shown in FIG. 6, the object side surface 15 of the first lens element 1 has an effective radius D1. The effective radius D1 refers to a distance between a point where a radially outermost marginal ray passing through the object side surface 15 intersects the object side surface 15 and the optical axis I in the radial direction k.

Besides, in the embodiment, a total of 10 surfaces, i.e., the object side surfaces 25, 35, 45, 55, and 65 and the image side surfaces 26, 36, 46, 56, and 66 of the second lens element 2, the third lens element 3, the fourth lens element 4, the fifth lens element 5, and the sixth lens element 6, are all aspheric surfaces. The aspheric surfaces are defined based on Equation (1) as follows.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Y: a distance from a point on an aspheric curve to the optical axis;

Z: a depth of the aspheric surface (i.e., a vertical distance between the point on the aspheric surface that is spaced by the distance Y from the optical axis and a tangent plane tangent to a vertex of the aspheric surface on the optical axis);

R: a radius of curvature of the surface of the lens;

K: a conic constant;

$a_i$: an $i^{th}$ aspheric coefficient.

Respective aspheric coefficients of the object side surface 25 of the second lens element 2 to the image side surface 66 of the sixth lens element 6 in Equation (1) are as shown in FIG. 9. For example, the row number 25 in FIG. 9 indicates that the values are aspheric coefficients of the object side surface 25 of the second lens element 2. Other rows are arranged based on the same principle.

Besides, relations of important parameters in the optical imaging lens 10 according to the first embodiment are as shown in FIGS. 46 and 47. In addition, the unit of the respective parameters listed in the rows from T1 to HFOV in FIG. 46 is mm.

Specifically,

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

T6 is a thickness of the sixth lens element 6 along the optical axis I;

G12 is a distance between the image side surface 16 of the first lens element 1 and the object side surface 25 of the second lens element 2 along the optical axis I;

G23 is a distance between the image side surface 26 of the second lens element 2 and the object side surface 35 of the third lens element 3 along the optical axis I;

G34 is a distance between the image side surface 36 of the third lens element 3 and the object side surface 45 of the fourth lens element 4 along the optical axis I;

G45 is a distance between the image side surface 46 of the fourth lens element 4 and the object side surface 55 of the fifth lens element 5 along the optical axis I;

G56 is a distance between the image side surface 56 of the fifth lens element 5 and the object side surface 65 of the sixth lens element 6 along the optical axis I;

AAG is a sum of the distance between the image side surface 16 of the first lens element 1 and the object side surface 25 of the second lens element 2 along the optical axis I, the distance between the image side surface 26 of the second lens element 2 and the object side surface 35 of the third lens element 3 along the optical axis I, the distance between the image side surface 36 of the third lens element 3 and the object side surface 45 of the fourth lens element 4 along the optical axis I, the distance between the image side surface 46 of the fourth lens element 4 and the object side surface 55 of the fifth lens element 5 along the optical axis I, and the distance between the image side surface 56 of the fifth lens element 5 and the object side surface 65 of the sixth lens element 6 along the optical axis I;

ALT is a sum of thicknesses of all the lens elements having refracting power of the optical imaging lens 10 in the optical axis I;

TL is a distance between the object side surface 15 of the first lens element 1 and the image side surface 66 of the sixth lens element 6 along the optical axis I; and TTL is a distance between the object side surface 15 of the first lens element 1 and the image plane 99 of the optical imaging lens 10 along the optical axis I; and BFL is a distance between the image side surface 66 of the sixth lens element 6 and the image plane 99 of the optical imaging lens 10 along the optical axis I;

EFL is an effective focal length of the optical imaging lens 10;

G6F is a distance between the image side surface 66 of the sixth lens element 6 and the object side surface 95 of the filter 9 along the optical axis I;

TF is a thickness of the filter 9 along the optical axis I;

GFP is a distance between the image side surface 96 of the filter 9 and the image plane 99 of the optical imaging lens 10 along the optical axis I;

D1 is an effective radius of the object side surface 15 of the first lens element 1;

D2 is a radius of the aperture stop 0;

HFOV is a half field of view of the optical imaging lens 10.

Besides, other definitions include:

ImgH is an image height of the optical imaging lens 10;

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

V1 is an Abbe number of the first lens element 1;

V2 is an Abbe number of the second lens element 2;

V3 is an Abbe number of the third lens element 3;

V4 is an Abbe number of the fourth lens element 4;

V5 is an Abbe number of the fifth lens element 5; and

V6 is an Abbe number of the sixth lens element 6.

Referring to FIGS. 7A to 7D, FIG. 7A illustrates the longitudinal spherical aberration of the first embodiment, FIGS. 7B and 7C respectively illustrate the astigmatic field curves in the Sagittal direction and the astigmatic field curves in the Tangential direction on the image plane 99 of the first embodiment when the wavelength of the first embodiment is 470 mm, 555 mm, and 650 mm, and FIG. 7D illustrates the distortion aberration on the image plane 99 of the first embodiment when the wavelength of the first embodiment is 470 mm, 555 mm, and 650 mm. In FIG. 7A illustrating the longitudinal spherical aberration of the first embodiment, the curves representing the respective wavelengths are close to each other and approach the center, indicating that off-axis rays in different heights at the respective wavelengths are concentrated in a vicinity of the imaging point. Based on extents of deviation of the curves for the respective wavelengths, imaging point deviations of the off-axis rays in different heights are controlled within a range of ±0.02 mm. Therefore, the spherical aberration of the same wavelength is reduced in the first embodiment, and the distances among the three representing wavelengths are also close, indicating that imaging positions of rays of different wavelengths are concentrated. Hence, chromatic aberration is also suppressed.

In FIGS. 7B and 7C illustrating the astigmatic field curves, focal distance variations of the three representing wavelengths in the whole field range fall within ±0.025 mm, indicating that the optical imaging lens of the first embodiment is able to effectively reduce aberration. In FIG. 7D illustrating the distortion aberration, the distortion aberration of the first embodiment is maintained within a range of ±20%, indicating that the distortion aberration of the first embodiment satisfies an imaging quality requirement of an optical imaging lens. Hence, compared with known optical imaging lenses, the first embodiment is able to render a preferable imaging quality under a condition that the system length is reduced to about 15.592 mm.

FIG. 10 is a schematic diagram illustrating an optical imaging lens according to a second embodiment of the invention, and FIGS. 11A to 11D are diagrams illustrating a longitudinal spherical aberration and various aberrations of the optical imaging lens according to the second embodiment. Referring to FIG. 10, the second embodiment of the optical imaging lens 10 is similar to the first embodiment, and the differences therebetween mainly include the following: an optical axis region 153 of the object side surface 15 of the first lens element 1 is concave, a periphery region 154 of the object side surface 15 of the first lens element 1 is concave, an optical axis region 163 of the image side surface 16 of the first lens element 1 is convex, a periphery region 164 of the image side surface 16 of the first lens element 1 is convex, a periphery region 253 of the object side surface 25 of the second lens element 2 is concave, the third lens element 3 has positive refracting power, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 10.

Detailed optical data of the optical imaging lens 10 of the second embodiment are as shown in FIG. 12. In addition, the system length of the optical imaging lens 10 of the second embodiment is 16.214 mm, the EFL of the optical imaging lens 10 of the second embodiment is 2.926 mm, the HFOV thereof is 32.000, the image height thereof is 1.659 mm, and the Fno thereof is 1.7.

Respective aspheric coefficients of the object side surface 25 of the second lens element 2 to the image side surface 66 of the sixth lens element 6 of the second embodiment in Equation (1) are as shown in FIG. 13.

In addition, relations of important parameters in the optical imaging lens 10 according to the second embodiment are as shown in FIGS. 46 and 47.

The longitudinal spherical aberration of the second embodiment is shown in FIG. 11A, and imaging point deviations of the off-axis rays in different heights are controlled within a range of ±0.025 mm. In FIGS. 11B and 11C illustrating the astigmatic field curves, focal distance variations of the three representing wavelengths in the whole field range fall within ±0.025 mm. The distortion aberration shown in FIG. 11D indicates that the distortion aberration of the second embodiment is maintained within a range of ±10%.

Based on the above, the Fno of the second embodiment is less than the Fno of the first embodiment, and the astigmatic field curves of the second embodiment are less than the astigmatic field curves of the first embodiment. Besides, compared with the first embodiment, the second embodiment is easier to manufacture and therefore has a higher yield rate.

FIG. 14 is a schematic diagram illustrating an optical imaging lens according to a third embodiment of the invention, and FIGS. 15A to 15D are diagrams illustrating a longitudinal spherical aberration and various aberrations of the optical imaging lens according to the third embodiment. Referring to FIG. 14, the third embodiment of the optical imaging lens 10 is similar to the first embodiment, and the differences therebetween mainly include the following: in the third embodiment, the third lens element 3 has positive refracting power, the fourth lens element 4 has negative refracting power, an optical axis region 453 of the object side surface 45 of the fourth lens element 4 is concave, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 14.

Detailed optical data of the optical imaging lens 10 of the third embodiment are as shown in FIG. 16. In addition, the system length of the optical imaging lens 10 of the third embodiment is 20.000 mm, the EFL of the optical imaging lens element 10 of the third embodiment is 4.137 mm, the HFOV thereof is 38.950, the image height thereof is 3.110 mm, and the Fno thereof is 1.850.

Respective aspheric coefficients of the object side surface 25 of the second lens element 2 to the image side surface 66 of the sixth lens element 6 of the third embodiment in Equation (1) are as shown in FIG. 17.

In addition, relations of important parameters in the optical imaging lens 10 according to the third embodiment are as shown in FIGS. 46 and 47.

The longitudinal spherical aberration of the third embodiment is shown in FIG. 15A, and imaging point deviations of the off-axis rays in different heights are controlled within a range of ±0.025 mm. In FIGS. 15B and 15C illustrating the astigmatic field curves, focal distance variations of the three representing wavelengths in the whole field range fall within ±0.050 mm. The distortion aberration shown in FIG. 15D indicates that the distortion aberration of the third embodiment is maintained within a range of ±8%.

Based on the above, the distortion aberration of the third embodiment is less than the distortion aberration of the first embodiment. Besides, compared with the first embodiment, the third embodiment is easier to manufacture and therefore has a higher yield rate.

Figure 18:
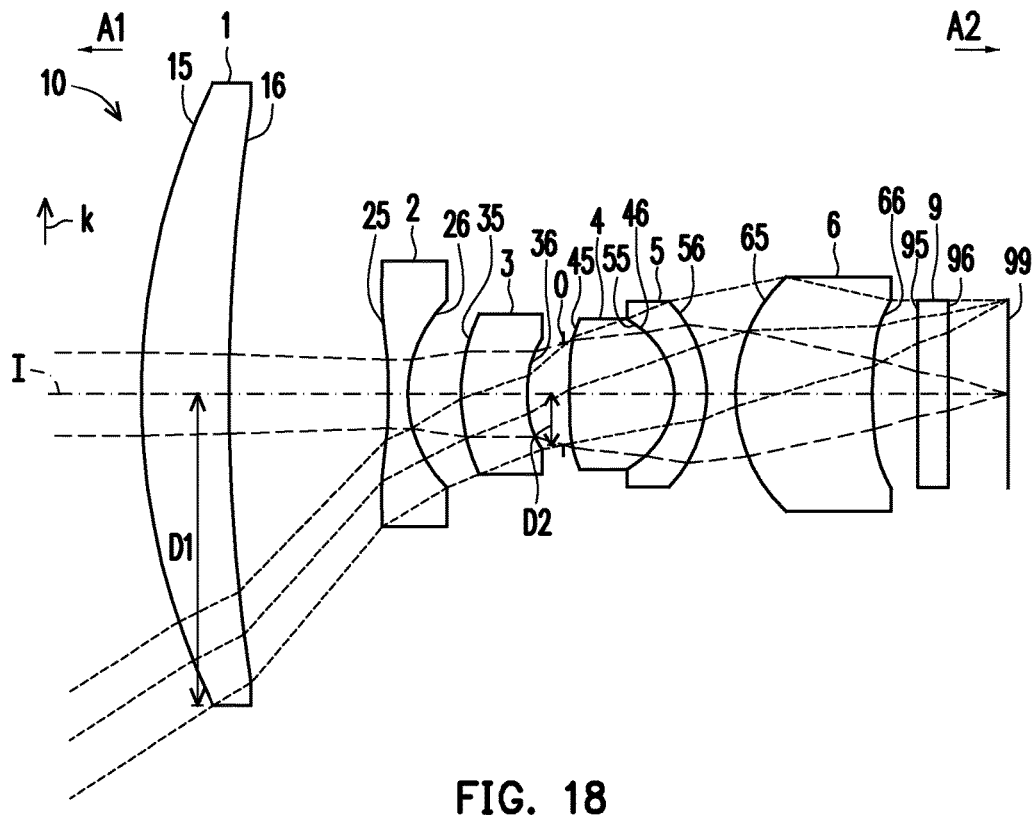
FIG. 18 is a schematic diagram illustrating an optical imaging lens according to a fourth embodiment of the invention.

FIG. 18 is a schematic diagram illustrating an optical imaging lens according to a fourth embodiment of the invention, and FIGS. 19A to 19D are diagrams illustrating a longitudinal spherical aberration and various aberrations of the optical imaging lens according to the fourth embodiment. Referring to FIG. 18, the fourth embodiment of the optical imaging lens 10 is similar to the first embodiment, and the differences therebetween mainly include the following: in the fourth embodiment, the third lens element 3 has positive refracting power, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 18.

Detailed optical data of the optical imaging lens 10 of the fourth embodiment are as shown in FIG. 20. In addition, the system length of the optical imaging lens 10 of the fourth embodiment is 19.980 mm, the EFL of the optical imaging lens element 10 of the fourth embodiment is 3.558 mm, the HFOV thereof is 33.000, the image height thereof is 2.166 mm, and the Fno thereof is 1.850.

Respective aspheric coefficients of the object side surface 25 of the second lens element 2 to the image side surface 66 of the sixth lens element 6 of the fourth embodiment in Equation (1) are as shown in FIG. 21.

In addition, relations of important parameters in the optical imaging lens 10 according to the fourth embodiment are as shown in FIGS. 46 and 47.

Figure 19A:
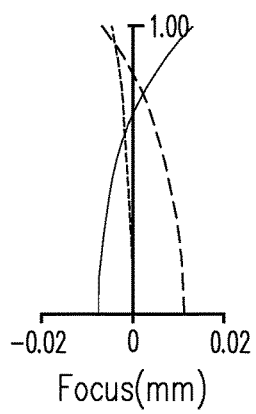
FIGS. 19A to 19D are diagrams illustrating a longitudinal spherical aberration and various aberrations of the optical imaging lens according to the fourth embodiment.
Figure 19B:
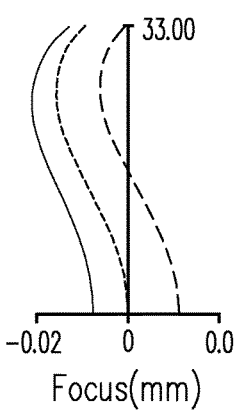
Figure 19C:
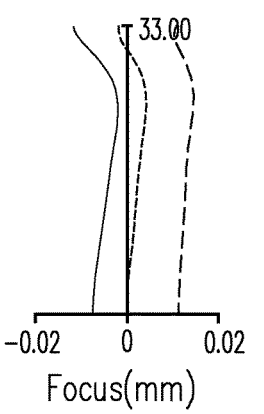
Figure 19D:
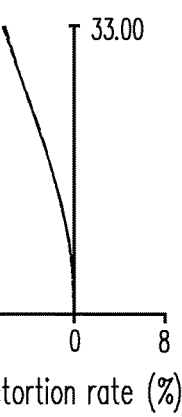

The longitudinal spherical aberration of the fourth embodiment is shown in FIG. 19A, and imaging point deviations of the off-axis rays in different heights are controlled within a range of ±0.02 mm. In FIGS. 19B and 19C illustrating the astigmatic field curves, focal distance variations of the three representing wavelengths in the whole field range fall within ±0.02 mm. The distortion aberration shown in FIG. 19D indicates that the distortion aberration of the fourth embodiment is maintained within a range of ±8%.

Based on the above, the astigmatic field curves in the Sagittal direction and the Tangential direction of the fourth embodiment are less than the astigmatic field curves in the Sagittal direction and the Tangential direction of the first embodiment, and the distortion aberration of the fourth embodiment is less than the distortion aberration of the first embodiment. Besides, compared with the first embodiment, the fourth embodiment is easier to manufacture and therefore has a higher yield rate.

Figure 22:
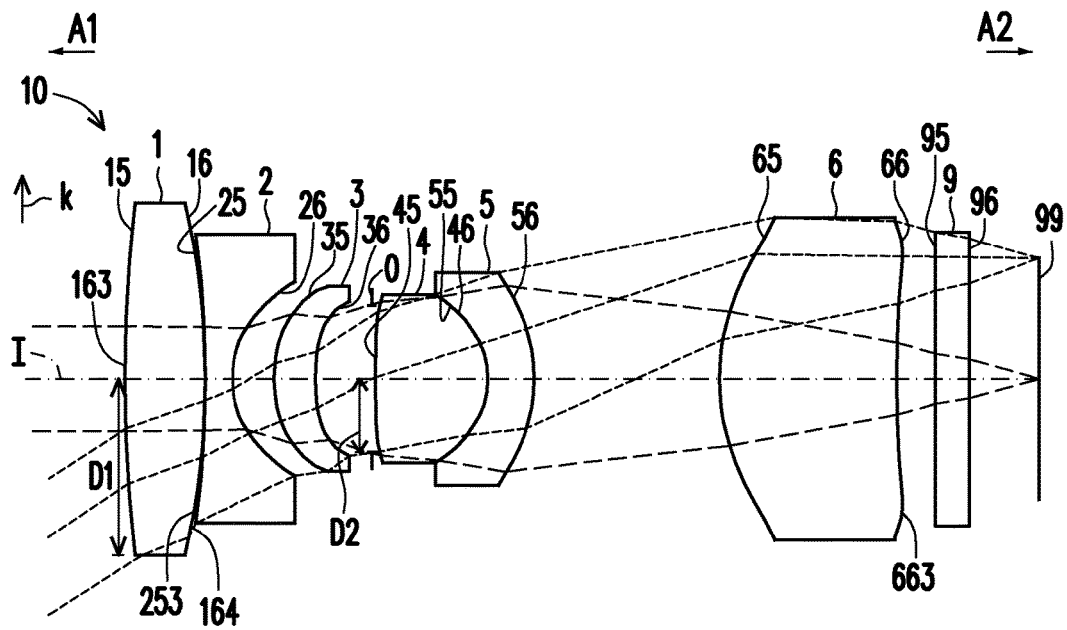
FIG. 22 is a schematic diagram illustrating an optical imaging lens according to a fifth embodiment of the invention.

FIG. 22 is a schematic diagram illustrating an optical imaging lens according to a fifth embodiment of the invention, and FIGS. 23A to 23D are diagrams illustrating a longitudinal spherical aberration and various aberrations of the optical imaging lens according to the fifth embodiment. Referring to FIG. 22, the fifth embodiment of the optical imaging lens 10 is similar to the first embodiment, and the differences therebetween mainly include the following: in the fifth embodiment, the optical axis region 163 of the image side surface 16 of the first lens element 1 is convex, the periphery region 164 of the image side surface 16 of the first lens element 1 is convex, the periphery region 253 of the object side surface 25 of the second lens element 2 is concave, the third lens element 3 has positive refracting power, a periphery region 663 of the image side surface 66 of the sixth lens element 6 is convex, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 22.

Detailed optical data of the optical imaging lens 10 of the fifth embodiment are as shown in FIG. 24. In addition, the system length of the optical imaging lens 10 of the fifth embodiment is 18.451 mm, the EFL of the optical imaging lens element 10 of the fifth embodiment is 3.940 mm, the HFOV thereof is 33.000, the image height thereof is 2.416 mm, and the Fno thereof is 1.850.

Respective aspheric coefficients of the object side surface 25 of the second lens element 2 to the image side surface 66 of the sixth lens element 6 of the fifth embodiment in Equation (1) are as shown in FIG. 25.

In addition, relations of important parameters in the optical imaging lens 10 according to the fifth embodiment are as shown in FIGS. 46 and 47.

Figure 23A:
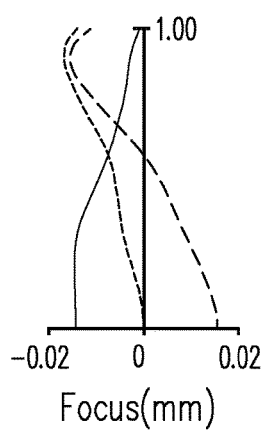
FIGS. 23A to 23D are diagrams illustrating a longitudinal spherical aberration and various aberrations of the optical imaging lens according to the fifth embodiment.
Figure 23B:
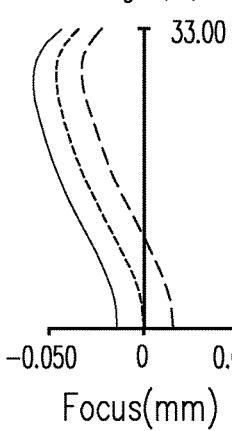
Figure 23C:
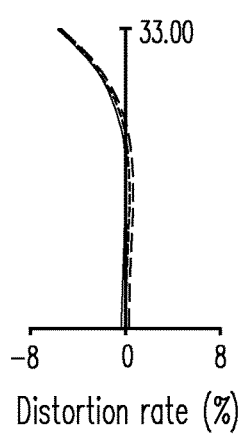
Figure 23D:
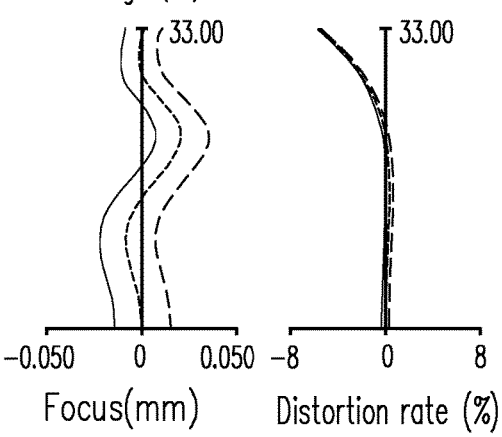

The longitudinal spherical aberration of the fifth embodiment is shown in FIG. 23A, and imaging point deviations of the off-axis rays in different heights are controlled within a range of ±0.02 mm. In FIGS. 23B and 23C illustrating the astigmatic field curves, focal distance variations of the three representing wavelengths in the whole field range fall within ±0.050 mm. The distortion aberration shown in FIG. 23D indicates that the distortion aberration of the fifth embodiment is maintained within a range of ±8%.

Based on the above, the distortion aberration of the fifth embodiment is less than the distortion aberration of the first embodiment. Besides, compared with the first embodiment, the fifth embodiment is easier to manufacture and therefore has a higher yield rate.

FIG. 26 is a schematic diagram illustrating an optical imaging lens according to a sixth embodiment of the invention, and FIGS. 27A to 27D are diagrams illustrating a longitudinal spherical aberration and various aberrations of the optical imaging lens according to the sixth embodiment. Referring to FIG. 26, the sixth embodiment of the optical imaging lens 10 is similar to the first embodiment, and the differences therebetween mainly include the following: in the sixth embodiment, the third lens element 3 has positive refracting power, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 26.

Detailed optical data of the optical imaging lens 10 of the sixth embodiment are as shown in FIG. 28. In addition, the system length of the optical imaging lens 10 of the sixth embodiment is 14.516 mm, the EFL of the optical imaging lens element 10 of the sixth embodiment is 3.805 mm, the HFOV thereof is 38.950, the image height thereof is 2.798 mm, and the Fno thereof is 1.850.

Respective aspheric coefficients of the object side surface 25 of the second lens element 2 to the image side surface 66 of the sixth lens element 6 of the sixth embodiment in Equation (1) are as shown in FIG. 29.

In addition, relations of important parameters in the optical imaging lens 10 according to the sixth embodiment are as shown in FIGS. 46 and 47.

The longitudinal spherical aberration of the sixth embodiment is shown in FIG. 27A, and imaging point deviations of the off-axis rays in different heights are controlled within a range of ±0.050 mm. In FIGS. 27B and 27C illustrating the astigmatic field curves, focal distance variations of the three representing wavelengths in the whole field range fall within ±0.050 mm. The distortion aberration shown in FIG. 27D indicates that the distortion aberration of the sixth embodiment is maintained within a range of ±10%.

Based on the above, the system length of the sixth embodiment is shorter than the system length of the first embodiment, and the distortion aberration of the sixth embodiment is less than the distortion aberration of the first embodiment. Besides, compared with the first embodiment, the sixth embodiment is easier to manufacture and therefore has a higher yield rate.

Figure 30:
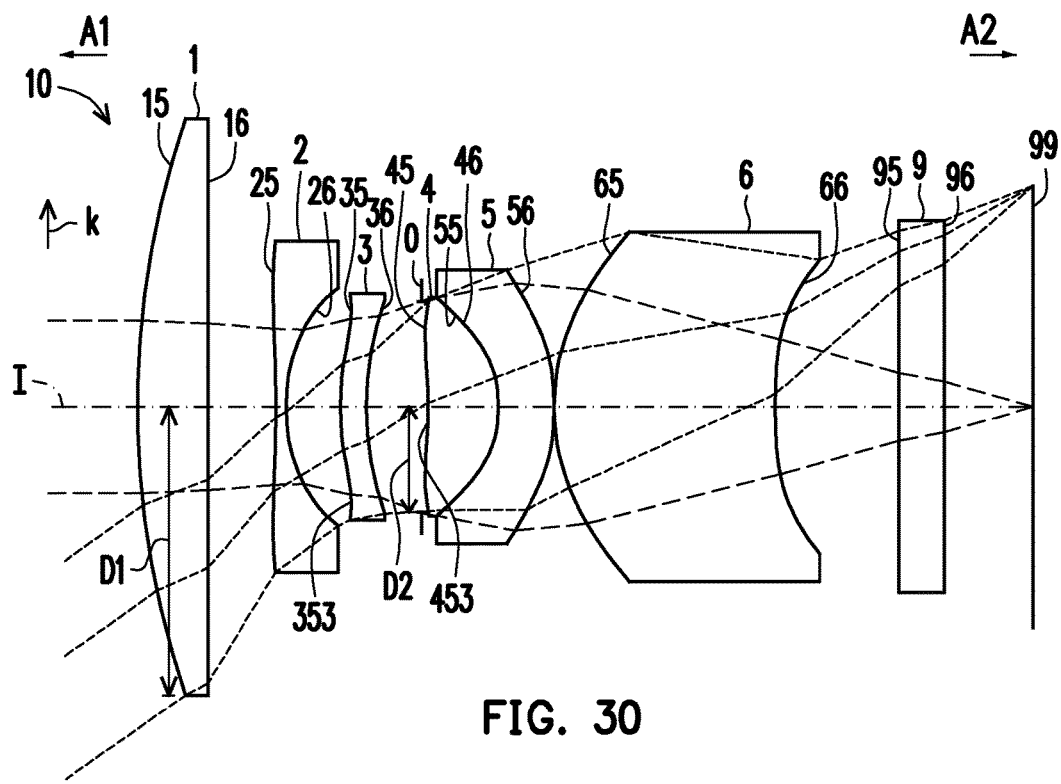
FIG. 30 is a schematic diagram illustrating an optical imaging lens according to a seventh embodiment of the invention.

FIG. 30 is a schematic diagram illustrating an optical imaging lens according to a seventh embodiment of the invention, and FIGS. 31A to 31D are diagrams illustrating a longitudinal spherical aberration and various aberrations of the optical imaging lens according to the seventh embodiment. Referring to FIG. 30, the seventh embodiment of the optical imaging lens 10 is similar to the first embodiment, and the differences therebetween mainly include the following: in the seventh embodiment, the third lens element 3 has positive refracting power, the periphery region 353 of the object side surface 35 of the third lens element 3 is concave, the fourth lens element 4 has negative refracting power, the optical axis region 453 of the object side surface 45 of the fourth lens element 4 is concave, and respective optical data, aspheric coefficients and parameters among the lens elements 1, 2, 3, 4, 5, and 6 of the two embodiments are different to a more or lesser extent. To clearly illustrate the drawing, some reference numerals indicating optical axis regions and periphery regions same as those in the first embodiment are omitted in FIG. 30.

Detailed optical data of the optical imaging lens 10 of the seventh embodiment are as shown in FIG. 32. In addition, the system length of the optical imaging lens 10 of the seventh embodiment is 20.000 mm, the EFL of the optical imaging lens element 10 of the seventh embodiment is 7.046 mm, the HFOV thereof is 35.000, the image height thereof is 4.881 mm, and the Fno thereof is 1.850.

Respective aspheric coefficients of the object side surface 25 of the second lens element 2 to the image side surface 66 of the sixth lens element 6 of the seventh embodiment in Equation (1) are as shown in FIG. 33.

In addition, relations of important parameters in the optical imaging lens 10 according to the seventh embodiment are as shown in FIGS. 46 and 47.

Figure 31A:
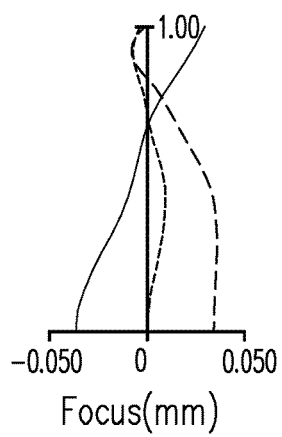
FIGS. 31A to 31D are diagrams illustrating a longitudinal spherical aberration and various aberrations of the optical imaging lens according to the seventh embodiment.
Figure 31B:
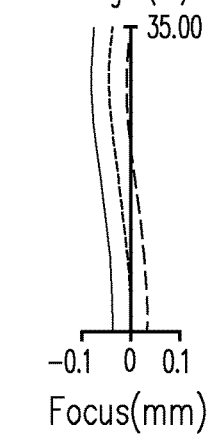
Figure 31C:
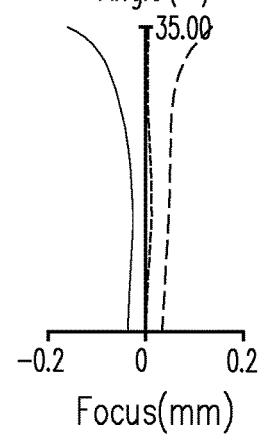
Figure 31D:
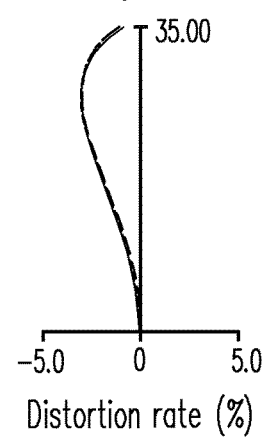

The longitudinal spherical aberration of the seventh embodiment is shown in FIG. 31A, and imaging point deviations of the off-axis rays in different heights are controlled within a range of ±0.050 mm. In FIG. 31B illustrating the astigmatic field curves, focal distance variations of the three representing wavelengths in the whole field range fall within ±0.1 mm. In FIG. 31C illustrating the astigmatic field curves, focal distance variations of the three representing wavelengths in the whole field range fall within ±0.2 mm. The distortion aberration shown in FIG. 31D indicates that the distortion aberration of the seventh embodiment is maintained within a range of ±5%.

Based on the above, the distortion aberration of the seventh embodiment is less than the distortion aberration of the first embodiment. Besides, compared with the first embodiment, the seventh embodiment is easier to manufacture and therefore has a higher yield rate.

FIG. 34 is a schematic diagram illustrating an optical imaging lens according to an eighth embodiment of the invention, and FIGS. 35A to 35D are diagrams illustrating a longitudinal spherical aberration and various aberrations of the optical imaging lens according to the eighth embodiment. Referring to FIG. 34, from the object side A1 to the image side A2 along the optical axis I of the optical imaging lens 10 according to the eighth embodiment of the invention, the optical imaging lens 10 sequentially includes the first lens element 1, the second lens element 2, the third lens element 3, the aperture stop 0, a seventh lens element 7, the fourth lens element 4, the fifth lens element 5, the sixth lens element 6, and the filter 9. When a ray emitted from an object to be shot enters the optical imaging lens 10, an image may be formed on the image plane 99 after the ray sequentially passes through the first lens element 1, the second lens element 2, the third lens element 3, the aperture stop 0, the seventh lens element 7, the fourth lens element 4, the fifth lens element 5, the sixth lens element 6, and the filter 9. In addition, the object side A1 is a side facing toward the object to be shot, whereas the image side A2 is a side facing toward the image plane 99.

In the embodiment, the first lens element 1, the second lens element 2, the third lens element 3, the seventh lens element 7, the fourth lens element 4, the fifth lens element 5, the sixth lens element 6, and the filter 9 respectively have the object side surfaces 15, 25, 35, 75, 45, 55, 65, and 95 facing toward the object side A1 and allowing an imaging ray to pass through and the image side surfaces 16, 26, 36, 76, 46, 56, 66, and 96 facing toward the image side A2 and allowing the imaging ray to pass through.

The first lens element 1 has positive refracting power. An optical axis region 151 of the object side surface 15 of the first lens element 1 is convex, and a periphery region 152 of the object side surface 15 of the first lens element 1 is convex. An optical axis region 161 of the image side surface 16 of the first lens element 1 is concave, and the periphery region 162 of the image side surface 16 of the first lens element 1 is concave. In the embodiment, a material of the first lens element 1 is glass. The object side surface 15 and the image side surface 16 of the first lens element 1 are spherical surfaces.

The second lens element 2 has negative refracting power. An optical axis region 251 of the object side surface 25 of the second lens element 2 is concave, and the periphery region 252 of the object side surface 25 of the second lens element 2 is convex. An optical axis region 261 of the image side surface 26 of the second lens element 2 is concave, and the periphery region 262 of the image side surface 26 of the second lens element 2 is concave. In the embodiment, a material of the second lens element 2 is plastic. The object side surface 25 and the image side surface 26 of the second lens element 2 are aspheric surfaces.

The third lens element 3 has positive refracting power. An optical axis region 351 of the object side surface 35 of the third lens element 3 is convex, and a periphery region 352 of the object side surface 35 of the third lens element 3 is convex. An optical axis region 361 of the image side surface 36 of the third lens element 3 is concave, and the periphery region 362 of the image side surface 36 of the third lens element 3 is concave. In the embodiment, a material of the third lens element 3 is plastic. The object side surface 35 and the image side surface 36 of the third lens element 3 are aspheric surfaces.

In the eighth embodiment, the aperture stop 0 is disposed between the third lens element 3 and the seventh lens element 7. The aperture stop 0 has the radius D2. The radius D2 of the aperture stop 0 refers to a distance between an optical boundary (i.e., a point where a radially outermost marginal ray passing through the aperture stop 0 intersects the aperture stop 0) of the aperture stop 0 and the optical axis I of the optical imaging lens 10 in a radial direction k. In addition, the radial direction k is perpendicular to the optical axis I.

The seventh lens element 7 has positive refracting power. An optical axis region 751 of the object side surface 75 of the seventh lens element 7 is convex, and a periphery region 752 of the object side surface 75 of the seventh lens element 7 is convex. An optical axis region 761 of the image side surface 76 of the seventh lens element 7 is concave, and a periphery region 762 of the image side surface 76 of the seventh lens element 7 is concave. In the embodiment, a material of the seventh lens element 7 is plastic. The object side surface 75 of the seventh lens element 7 is an aspheric surface, and the image side surface 76 of the seventh lens element 7 is a spherical surface.

The fourth lens element 4 has positive refracting power. An optical axis region 451 of the object side surface 45 of the fourth lens element 4 is convex, and the periphery region 452 of the object side surface 45 of the fourth lens element 4 is convex. An optical axis region 461 of the image side surface 46 of the fourth lens element 4 is convex, and the periphery region 462 of the image side surface 46 of the fourth lens element 4 is convex. In the embodiment, a material of the fourth lens element 4 is plastic. The object side surface 45 of the fourth lens element 4 is a spherical surface, and the image side surface 46 of the fourth lens element 4 is an aspheric surface.

The fifth lens element 5 has positive refracting power. An optical axis region 551 of the object side surface 55 of the fifth lens element 5 is concave, and the periphery region 552 of the object side surface 55 of the fifth lens element 5 is concave. An optical axis region 561 of the image side surface 56 of the fifth lens element 5 is convex, and the periphery region 562 of the image side surface 56 of the fifth lens element 5 is convex. In the embodiment, a material of the fifth lens element 5 is plastic. The object side surface 55 and the image side surface 56 of the fifth lens element 5 are aspheric surfaces.

In the embodiment, the image side surface 46 of the fourth lens element 4 and the object side surface 55 of the fifth lens element 5 are cemented by a cemented material. Therefore, instead of an air gap, the adhering material is provided between the image side surface 46 of the fourth lens element 4 and the object side surface 55 of the fifth lens element 5.

The sixth lens element 6 has positive refracting power. An optical axis region 651 of the object side surface 65 of the sixth lens element 6 is convex, and the periphery region 652 of the object side surface 65 of the sixth lens element 6 is convex. An optical axis region 661 of the image side surface 66 of the sixth lens element 6 is concave, and the periphery region 662 of the image side surface 66 of the sixth lens element 6 is concave. In the embodiment, a material of the sixth lens element 6 is plastic. The object side surface 65 and the image side surface 66 of the sixth lens element 6 are aspheric surfaces.

The filter 9 is disposed between the image side surface 62 of the sixth lens element 6 and the image plane 99. In the embodiment, the filter 9 is an IR cut filter, for example. The IR cut filter is capable of filtering out infrared light and allowing visible light to pass through. In the embodiment, a material of the filter 9 includes glass.

Lens elements having refracting power in the optical imaging lens 10 of the eighth embodiment are only seven lens elements, i.e., the first lens element 1, the second lens element 2, the third lens element 3, the seventh lens element 7, the fourth lens element 4, the fifth lens element 5, and the sixth lens element 6.

Other detailed optical data of the eighth embodiment are as shown in FIG. 36. In addition, the system length (TTL) of the optical imaging lens 10 of the eighth embodiment is 20.000 mm, the effective focal length (EFL) of the optical imaging lens element 10 of the eighth embodiment is 3.623 mm, the half field of view (HFOV) thereof is 38.950, the image height thereof is 2.649 mm, and the f-number (Fno) thereof is 1.850. The system length refers to a distance on the optical axis I from the object side surface 15 of the first lens element 1 to the image plane 99. The effective focal length refers to a distance between an optical boundary of each element surface (i.e., a point where a radially outermost marginal ray passing through the element surface intersects the element surface) and the optical axis I in a radial direction k, wherein the radial direction k is perpendicular to the optical axis I. For example, as shown in FIG. 34, the object side surface 15 of the first lens element 1 has the effective radius D1. The effective radius D1 refers to a distance between a point where a radially outermost marginal ray passing through the object side surface 15 intersects the object side surface 15 and the optical axis I in the radial direction k.

Besides, in the embodiment, a total of 10 surfaces, i.e., the object side surfaces 25, 35, 75, 55, and 65 and the image side surfaces 26, 36, 46, 56, and 66 of the second lens element 2, the third lens element 3, the seventh lens element 7, the fourth lens element 4, the fifth lens element 5, and the sixth lens element 6, are all aspheric surfaces. The aspheric surfaces are defined based on Equation (1) as follows.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Y: a distance from a point on an aspheric curve to the optical axis;

Z: a depth of the aspheric surface (i.e., a vertical distance between the point on the aspheric surface that is spaced by the distance Y from the optical axis and a tangent plane tangent to a vertex of the aspheric surface on the optical axis);

R: a radius of curvature of the surface of the lens;

K: a conic constant;

$a_i$: an $i^{th}$ aspheric coefficient.

Respective aspheric coefficients of the object side surface 25 of the second lens element 2 to the image side surface 66 of the sixth lens element 6 in Equation (1) are as shown in FIG. 37. For example, the row number 25 in FIG. 37 indicates that the values are aspheric coefficients of the object side surface 25 of the second lens element 2. Other rows are arranged based on the same principle.

Besides, relations of important parameters in the optical imaging lens 10 according to the eighth embodiment are as shown in FIGS. 48 and 49. In addition, the unit of the respective parameters listed in the rows from T1 to HFOV in FIG. 48 is mm.

Specifically,

T1 is a thickness of the first lens element 1 along the optical axis I;

T2 is a thickness of the second lens element 2 along the optical axis I;

T3 is a thickness of the third lens element 3 along the optical axis I;

T7 is a thickness of the seventh lens element 7 along the optical axis I;

T4 is a thickness of the fourth lens element 4 along the optical axis I;

T5 is a thickness of the fifth lens element 5 along the optical axis I;

T6 is a thickness of the sixth lens element 6 along the optical axis I; G12 is a distance between the image side surface 16 of the first lens element 1 and the object side surface 25 of the second lens element 2 along the optical axis I;

G23 is a distance between the image side surface 26 of the second lens element 2 and the object side surface 35 of the third lens element 3 along the optical axis I;

G34 is a distance between the image side surface 36 of the third lens element 3 and the object side surface 45 of the fourth lens element 4 along the optical axis I;

G37 is a distance between the image side surface 36 of the third lens element 3 and the object side surface 75 of the seventh lens element 7 along the optical axis I;

G74 is a distance between the image side surface 76 of the seventh lens element 7 and the object side surface 45 of the fourth lens element 4 along the optical axis I;

G45 is a distance between the image side surface 46 of the fourth lens element 4 and the object side surface 55 of the fifth lens element 5 along the optical axis I;

G56 is a distance between the image side surface 56 of the fifth lens element 5 and the object side surface 65 of the sixth lens element 6 along the optical axis I;

AAG is a sum of the distance between the image side surface 16 of the first lens element 1 and the object side surface 25 of the second lens element 2 along the optical axis I, the distance between the image side surface 26 of the second lens element 2 and the object side surface 35 of the third lens element 3 along the optical axis I, the distance between the image side surface 36 of the third lens element 3 and the object side surface 45 of the fourth lens element 4 along the optical axis I, the distance between the image side surface 46 of the fourth lens element 4 and the object side surface 55 of the fifth lens element 5 along the optical axis I, and the distance between the image side surface 56 of the fifth lens element 5 and the object side surface 65 of the sixth lens element 6 along the optical axis I;

ALT is a sum of thicknesses of all the lens elements having refracting power of the optical imaging lens 10 in the optical axis I;

TL is a distance between the object side surface 15 of the first lens element 1 and the image side surface 66 of the sixth lens element 6 along the optical axis I; and TTL is a distance between the object side surface 15 of the first lens element 1 and the image plane 99 of the optical imaging lens 10 along the optical axis I; and BFL is a distance between the image side surface 66 of the sixth lens element 6 and the image plane 99 of the optical imaging lens 10 along the optical axis I;

EFL is an effective focal length of the optical imaging lens 10;

G6F is a distance between the image side surface 66 of the sixth lens element 6 and the object side surface 95 of the filter 9 along the optical axis I;

TF is a thickness of the filter 9 along the optical axis I;

GFP is a distance between the image side surface 96 of the filter 9 and the image plane 99 of the optical imaging lens 10 along the optical axis I;

D1 is an effective radius of the object side surface 15 of the first lens element 1;

D2 is a radius of the aperture stop 0;

HFOV is a half field of view of the optical imaging lens 10.

Besides, other definitions include:

ImgH is an image height of the optical imaging lens 10;

f1 is a focal length of the first lens element 1;

f2 is a focal length of the second lens element 2;

f3 is a focal length of the third lens element 3;

f7 is a focal length of the seventh lens element 7;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n7 is a refractive index of the seventh lens element 7;

n4 is a refractive index of the fourth lens element 4;

n5 is a refractive index of the fifth lens element 5;

n6 is a refractive index of the sixth lens element 6;

V1 is an Abbe number of the first lens element 1;
V2 is an Abbe number of the second lens element 2;
V3 is an Abbe number of the third lens element 3;
V7 is an Abbe number of the seventh lens element 7;
V4 is an Abbe number of the fourth lens element 4;
V5 is an Abbe number of the fifth lens element 5; and
V6 is an Abbe number of the sixth lens element 6.

Referring to FIGS. 35A to 35D, FIG. 35A illustrates the longitudinal spherical aberration of the eighth embodiment, FIGS. 35B and 35C respectively illustrate the astigmatic field curves in the Sagittal direction and the astigmatic field curves in the Tangential direction on the image plane 99 of the eighth embodiment when the wavelength of the eighth embodiment is 470 mm, 555 mm, and 650 mm, and FIG. 35D illustrates the distortion aberration on the image plane 99 of the eighth embodiment when the wavelength of the eighth embodiment is 470 mm, 555 mm, and 650 mm. In FIG. 35A illustrating the longitudinal spherical aberration of the eighth embodiment, the curves representing the respective wavelengths are close to each other and approach the center, indicating that off-axis rays in different heights at the respective wavelengths are concentrated in a vicinity of the imaging point. Based on extents of deviation of the curves for the respective wavelengths, imaging point deviations of the off-axis rays in different heights are controlled within a range of ±0.025 mm. Therefore, the spherical aberration of the same wavelength is reduced in the eighth embodiment, and the distances among the three representing wavelengths are also close, indicating that imaging positions of rays of different wavelengths are concentrated. Hence, chromatic aberration is also suppressed.

In FIGS. 35B and 35C illustrating the astigmatic field curves, focal distance variations of the three representing wavelengths in the whole field range respectively fall within ±0.050 mm and ±0.025 mm, indicating that the optical imaging lens of the eighth embodiment is able to effectively reduce aberration. In FIG. 35D illustrating the distortion aberration, the distortion aberration of the eighth embodiment is maintained within a range of ±10%, indicating that the distortion aberration of the eighth embodiment satisfies an imaging quality requirement of an optical imaging lens. Hence, compared with known optical imaging lenses, the eighth embodiment is able to render a preferable imaging quality under a condition that the system length is reduced to about 20.000 mm.

Based on the above, the eighth embodiment of the optical imaging lens 10 is similar to the first embodiment, and the differences therebetween mainly include: in the eighth embodiment, the optical imaging lens 10 further includes the seventh lens element 7, the third lens element 3 has positive refracting power, and respective optical data, aspheric coefficients and parameters among the lens elements 1, 2, 3, 7, 4, 5, and 6 of the two embodiments are different to a more or lesser extent. Besides, the distortion aberration of the eighth embodiment is less than the distortion aberration of the first embodiment. In addition, compared with the first embodiment, the eighth embodiment is easier to manufacture and therefore has a higher yield rate.

FIG. 38 is a schematic diagram illustrating an optical imaging lens according to a ninth embodiment of the invention, and FIGS. 39A to 39D are diagrams illustrating a longitudinal spherical aberration and various aberrations of the optical imaging lens according to the ninth embodiment. Referring to FIG. 38, the ninth embodiment of the optical imaging lens 10 is similar to the eighth embodiment, and the differences therebetween mainly include the following: in the ninth embodiment, the optical axis region 163 of the image side surface 16 of the first lens element 1 is convex and the periphery region 164 of the image side surface 16 of the first lens element 1 is convex, and respective optical data, aspheric coefficients and parameters among the lens elements 1, 2, 3, 7, 4, 5, and 6 are different to a more or lesser extent. To clearly illustrate the drawing, some reference numerals indicating optical axis regions and periphery regions same as those in the eighth embodiment are omitted in FIG. 38.

Detailed optical data of the optical imaging lens 10 of the ninth embodiment are as shown in FIG. 40. In addition, the system length of the optical imaging lens 10 of the ninth embodiment is 20.000 mm, the EFL of the optical imaging lens element 10 of the ninth embodiment is 2.994 mm, the HFOV thereof is 38.950, the image height thereof is 2.279 mm, and the Fno thereof is 1.850.

Respective aspheric coefficients of the object side surface 25 of the second lens element 2 to the image side surface 66 of the sixth lens element 6 of the ninth embodiment in Equation (1) are as shown in FIG. 41.

In addition, relations of important parameters in the optical imaging lens 10 according to the ninth embodiment are as shown in FIGS. 48 and 49.

The longitudinal spherical aberration of the ninth embodiment is shown in FIG. 39A, and imaging point deviations of the off-axis rays in different heights are controlled within a range of ±0.02 mm. In FIGS. 39B and 39C illustrating the astigmatic field curves, focal distance variations of the three representing wavelengths in the whole field range fall within ±0.02 mm. The distortion aberration shown in FIG. 39D indicates that the distortion aberration of the ninth embodiment is maintained within a range of ±8%.

Based on the above, the longitudinal spherical aberration of the ninth embodiment is less than the longitudinal spherical aberration of the eighth embodiment, the astigmatic field curves in the Sagittal direction and the Tangential direction of the ninth embodiment are less than the astigmatic field curves in the Sagittal direction and the Tangential direction of the eighth embodiment, and the distortion aberration of the ninth embodiment is less than the distortion aberration of the eighth embodiment. Besides, compared with the eighth embodiment, the ninth embodiment is easier to manufacture and therefore has a higher yield rate.

FIG. 42 is a schematic diagram illustrating an optical imaging lens according to a tenth embodiment of the invention, and FIGS. 43A to 43D are diagrams illustrating a longitudinal spherical aberration and various aberrations of the optical imaging lens according to the tenth embodiment. Referring to FIG. 42, the tenth embodiment of the optical imaging lens 10 is similar to the eighth embodiment, and the differences therebetween mainly include the following: in the tenth embodiment, the optical axis region 163 of the image side surface 16 of the first lens element 1 is convex, the periphery region 164 of the image side surface 16 of the first lens element 1 is convex, the periphery region 253 of the object side surface 25 of the second lens element 2 is concave, the periphery region 363 of the image side surface 36 of the third lens element 3 is convex, the seventh lens element 7 has negative refracting power, an optical axis region 753 of the object side surface 75 of the seventh lens element 7 is concave, a periphery region 754 of the object side surface 75 of the seventh lens element 7 is concave, an optical axis region 664 of the image side surface 66 of the sixth lens element 6 is convex, and respective optical data, aspheric coefficients and parameters among the lens elements 1, 2, 3, 7, 4, 5, and 6 are different to a more or lesser extent. To clearly illustrate the drawing, some reference numerals indicating optical axis regions and periphery regions same as those in the eighth embodiment are omitted in FIG. 42.

Detailed optical data of the optical imaging lens 10 of the tenth embodiment are as shown in FIG. 44. In addition, the system length of the optical imaging lens 10 of the tenth embodiment is 19.436 mm, the EFL of the optical imaging lens element 10 of the tenth embodiment is 2.875 mm, the HFOV thereof is 38.950, the image height thereof is 2.078 mm, and the Fno thereof is 1.850.

Respective aspheric coefficients of the object side surface 25 of the second lens element 2 to the image side surface 66 of the sixth lens element 6 of the tenth embodiment in Equation (1) are as shown in FIG. 43.

In addition, relations of important parameters in the optical imaging lens 10 according to the tenth embodiment are as shown in FIGS. 48 and 49.

The longitudinal spherical aberration of the tenth embodiment is shown in FIG. 43A, and imaging point deviations of the off-axis rays in different heights are controlled within a range off 0.050 mm. In FIGS. 43B and 43C illustrating the astigmatic field curves, focal distance variations of the three representing wavelengths in the whole field range fall within ±0.050 mm. The distortion aberration shown in FIG. 43D indicates that the distortion aberration of the tenth embodiment is maintained within a range of ±20%.

Based on the above, the system length of the tenth embodiment is less than the system length of the eighth embodiment. Besides, compared with the eighth embodiment, the tenth embodiment is easier to manufacture and therefore has a higher yield rate.

In view of the foregoing, the optical imaging lens 10 according to one or some exemplary embodiments of the invention is able to render one or some of the following:

i. The longitudinal spherical aberrations, the astigmatic aberrations, and the distortion aberrations of the respective embodiments of the invention meet the protocol of use. In addition, the off-axis rays of the three representing wavelengths, i.e., red, green, and blue, in different heights are all concentrated at the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., red, green, and blue, are close to each other, indicating that the embodiments of the invention are able to desirably concentrate rays of different wavelengths in various states. Therefore, the embodiments of the invention exhibit an excellent chromatic dispersion suppressing ability. In view of the foregoing, by designing and matching the lens elements in the embodiments of the invention, a desirable imaging quality is rendered.

ii. The negative refracting power of the second lens element 2 may help increase the HFOV. Together with the design configuring the periphery region 452 of the object side surface 45 of the fourth lens element 4 being convex and the periphery region 562 of the image side surface 56 of the fifth lens element 5 being convex, the image aberrations generated by the first lens element 1, the second lens element 2, and the third lens element 3 may be corrected.

iii. Cementing the fourth lens element 4 and the fifth lens element 5 may facilitate the imaging quality. Specifically, the effect is desirable if a configuration of surface shapes of lens elements where the optical axis region 461 of the image side surface 46 of the fourth lens element 4 is convex and the optical axis region 561 of the image side surface 56 of the fifth lens element 5 is convex is adopted. Moreover, in some embodiments, the cement together with the object side surfaces 45 and 55 and the image side surfaces 46 and 56 of the fourth lens element 4 and the fifth lens element 5 as aspheric surfaces may help correct various image aberrations.

iv. When HFOV≤45° is satisfied, a desirable configuration of the optical imaging system may be rendered and the system length may be reduced. The range may also be 32°≤HFOV≤45°.

v. With the effective radius D1 of the object side surface 15 of the first lens element 1 and the radius D2 of the aperture stop 0 meeting a condition of 2.000≤D1/D2, the system length may be reduced, and the imaging quality may be ensured. The range may also be 2.000≤D1/D2≤7.200.

vi. When TTL/T6≤6.300 is satisfied, a desirable configuration of the optical imaging system may be rendered and the system length may be reduced. The range may also be 4.000≤TTL/T6≤6.300.

vii. In order to reduce the system length and ensure the imaging quality, the air gap between lens elements or the thickness of the lens element may be reduced. Nevertheless, considering the manufacturing complexity, the configuration is more desirable if limitations on numerical values in the following conditions are satisfied:

ALT/(G12+G34)≤8.400, and the range may also be 2.200≤ALT/(G12+G34)≤8.400;

ALT/(T2+G23)≤8.900, and the range may also be 2.600≤ALT/(T2+G23)≤8.900;

AAG/(T5+G56)≤4.700, and the range may also be 1.200≤AAG/(T5+G56)≤4.700;

AAG/(T3+G45)≤6.900, and the range may also be 1.400≤AAG/(T3+G45)≤6.900;

(T1+T2+T3)/(G12+G34)≤4.100, and the range may also be 0.800≤(T1+T2+T3)/(G12+G34)≤4.100;

(G12+T3+T5+T6)/(T1+G23)≤3.000, and the range may also be 0.900≤(G12+T3+T5+T6)/(T1+G23)≤3.000;

(T3+G34+T4)/(T1+T2)≤2.000, and the range may also be 0.700≤(T3+G34+T4)/(T1+T2)≤2.000;

BFL/(G12+G23)≤3.400, and the range may also be 0.600≤BFL/(G12+G23)≤3.400;

(T6+BFL)/(G34+G45+G56)≤8.000, and the range may also be 1.200≤(T6+BFL)/(G34+G45+G56)≤8.000;

(AAG+BFL)/(T2+T3+T4)≤4.100, and the range may also be 1.100≤(AAG+BFL)/(T2+T3+T4)≤4.100; and (ALT+BFL)/(G12+G23+G34)≤6.100, and the range may also be 2.200≤(ALT+BFL)/(G12+G23+G34)≤6.100.

viii. Maintaining a ratio between an optical device parameter and a lens length at an appropriate value may avoid an excessively small parameter that may affect the production and manufacture or avoid an excessively great parameter that may render an excessively long lens. The appropriate value may be achieved if the conditions as follows are satisfied:

TTL/(T4+T6)≤3.800, and the range may also be 2.500≤TTL/(T4+T6)≤3.800;

TTL/(T1+T6)≤5.000, and the range may also be 2.400≤TTL/(T1+T6)≤5.000;

TTL/(T1+G12+T2+G23+T3)≤4.800, and the range may also be 2.100≤TTL/(T1+G12+T2+G23+T3)≤4.800;

TL/(T1+G12+G45+G56)≤7.000, and the range may also be 2.200≤TL/(T1+G12+G45+G56)≤7.000; and TL/(T1+T2+T3)≤7.000, and the range may also be 2.600≤TL/(T1+T2+T3)≤7.000.

ix. Reducing the EFL may help expand the field of view. Therefore, designing the EFL to be smaller and satisfying the following conditions may help enlarge the field of view when reducing the thickness of the optical system:

EFL/(T1+T2)≤4.000, and may be 0.700≤EFL/(T1+T2)≤4.000; and

EFL/(G12+G45+G56)≤7.200, and may be 0.800≤EFL/(G12+G45+G56)≤7.200.

The maximum and minimum numeral values derived from the combinations of the optical parameters disclosed in the embodiments of the invention may all be applicable and enable people skill in the pertinent art to implement the invention.

Besides, for lens designs having frameworks similar to that of the embodiments of the invention, limitations on the lens may be added by choosing an arbitrary combination/relation of the parameters of the embodiments. Considering the unpredictability in the design of optical system, under the framework of the embodiments of the invention, the lens according to the embodiments of the invention may have a shorter lens length, a greater applicable aperture, a desirable imaging quality, or a facilitated assembling yield rate if the above conditions are satisfied.

An arbitrary number of the exemplary limiting relations listed above may also be arbitrarily and optionally combined and incorporated into the embodiments of the invention. The invention shall not be construed as being limited thereto. When carrying out the embodiments of the invention, in addition to the above relations, the designer may further set other additional structural details of a specific lens elements or a plurality of lens elements in general, such as arrangements of concave/convex surfaces of lens elements, so as to reinforce the control over the system performance and/or the resolution. For example, a convex surface located at the optical axis region may be optionally and additionally formed on the object side surface of the first lens element. It should be noted that these details may be optionally incorporated and applied in other embodiments of the invention, if not conflicting.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, sequentially comprising a first lens element, a second lens element, a third lens element, a fourth lens element, a fifth lens element, and a sixth lens element along an optical axis from an object side to an image side, each of the first to sixth lens elements having an object side surface facing toward the object side and allowing an imaging ray to pass through and an image side surface facing toward the image side and allowing the imaging ray to pass through, the optical imaging lens further comprising an aperture stop located between the object side and the image side, wherein:

the first lens element is a lens element having refracting power in a first order from the object side to the image side, the second lens element is a lens element having refracting power in a second order from the object side to the image side, and the second lens element has negative refracting power, the third lens element is a lens element having refracting power in a third order from the object side to the image side, the fourth lens element is a lens element having refracting power in a third order from the image side to the object side, and a periphery region of the object side surface of the fourth lens element is convex, the fifth lens element is a lens element having refracting power in a second order from the image side to the object side, and a periphery region of the image side surface of the fifth lens element is convex, the sixth lens element is a lens element having refracting power in a first order from the image side to the object side, and the optical imaging lens satisfies conditions as follows:

HFOV≤45°, wherein HFOV is a half field of view of the optical imaging lens;

2.000≤D1/D2, wherein D1 is an effective radius of the object side surface of the first lens element, and D2 is a radius of the aperture stop; and TTL/T6≤6.300, wherein TTL is a distance between the object side surface of the first lens element and an image plane of the optical imaging lens along the optical axis, and T6 is a thickness of the sixth lens element along the optical axis.

2. The optical imaging lens as claimed in claim 1, wherein the optical imaging lens further satisfies a condition as follows:

TTL/(T4+T6)≤3.800, wherein T4 is a thickness of the fourth lens element along the optical axis.

3. The optical imaging lens as claimed in claim 1, wherein the optical imaging lens further satisfies a condition as follows:

TTL/(T1+T6)≤5.000, wherein T1 is a thickness of the first lens element along the optical axis.

4. The optical imaging lens as claimed in claim 1, wherein the optical imaging lens further satisfies a condition as follows:

TTL/(T1+G12+T2+G23+T3)≤4.800, wherein T1 is a thickness of the first lens element along the optical axis, G12 is a distance between the image side surface of the first lens element and the object side surface of the second lens element along the optical axis, T2 is a thickness of the second lens element along the optical axis, G23 is a distance between the image side surface of the second lens element to the object side surface of the third lens element along the optical axis, and T3 is a thickness of the third lens element along the optical axis.

5. The optical imaging lens as claimed in claim 1, wherein the optical imaging lens further satisfies a condition as follows:

TL/(T1+G12+G45+G56)≤7.000, wherein TL is a distance between the object side surface of the first lens element and the image side surface of the sixth lens element along the optical axis, T1 is a thickness of the first lens element along the optical axis, G12 is a distance between the image side surface of the first lens element and the object side surface of the second lens element along the optical axis, G45 is a distance between the image side surface of the fourth lens element and the object side surface of the fifth lens element along the optical axis, and G56 is a distance between the image side surface of the fifth lens element to the object side surface of the sixth lens element along the optical axis.

6. The optical imaging lens as claimed in claim 1, wherein the optical imaging lens further satisfies a condition as follows:

TL/(T1+T2+T3)≤7.000, wherein TL is a distance between the object side surface of the first lens element and the image side surface of the sixth lens element along the optical axis, T1 is a thickness of the first lens element along the optical axis, T2 is a thickness of the second lens element along the optical axis, and T3 is a thickness of the third lens element along the optical axis.

7. The optical imaging lens as claimed in claim 1, wherein the optical imaging lens further satisfies a condition as follows:

ALT/(G12+G34)≤8.400, wherein ALT is a total of thicknesses of all the lens elements having refracting power of the optical imaging lens along the optical axis, G12 is a distance between the image side surface of the first lens element and the object side surface of the second lens element along the optical axis, and G34 is a distance between the image side surface of the third lens element and the object side surface of the fourth lens element along the optical axis.

8. The optical imaging lens as claimed in claim 1, wherein the optical imaging lens further satisfies a condition as follows:

ALT/(T2+G23)≤8.900, wherein ALT is a total of thicknesses of all the lens elements having refracting power of the optical imaging lens along the optical axis, T2 is a thickness of the second lens element along the optical axis, and G23 is a distance between the image side surface of the second lens element and the object side surface of the third lens element along the optical axis.

9. The optical imaging lens as claimed in claim 1, wherein the optical imaging lens further satisfies a condition as follows:

AAG/(T5+G56)≤4.700, wherein AAG is a sum of a distance between the image side surface of the first lens element and the object side surface of the second lens element along the optical axis, a distance between the image side surface of the second lens element and the object side surface of the third lens element along the optical axis, a distance between the image side surface of the third lens element and the object side surface of the fourth lens element along the optical axis, a distance between the image side surface of the fourth lens element and the object side surface of the fifth lens element along the optical axis, and a distance between the image side surface of the fifth lens element and the object side surface of the sixth lens element along the optical axis, T5 is a thickness of the fifth lens element along the optical axis, and G56 is a distance between the image side surface of the fifth lens element and the object side surface of the sixth lens element along the optical axis.

10. The optical imaging lens as claimed in claim 1, wherein the optical imaging lens further satisfies a condition as follows:

AAG/(T3+G45)≤6.900, wherein AAG is a sum of a distance between the image side surface of the first lens element and the object side surface of the second lens element along the optical axis, a distance between the image side surface of the second lens element and the object side surface of the third lens element along the optical axis, a distance between the image side surface of the third lens element and the object side surface of the fourth lens element along the optical axis, a distance between the image side surface of the fourth lens element and the object side surface of the fifth lens element along the optical axis, and a distance between the image side surface of the fifth lens element and the object side surface of the sixth lens element along the optical axis, T3 is a thickness of the third lens element along the optical axis, and G45 is a distance between the image side surface of the fourth lens element and the object side surface of the fifth lens element along the optical axis.

11. The optical imaging lens as claimed in claim 1, wherein the optical imaging lens further satisfies a condition as follows:

(T1+T2+T3)/(G12+G34)≤4.100, wherein T1 is a thickness of the first lens element along the optical axis, T2 is a thickness of the second lens element along the optical axis, T3 is a thickness of the third lens element along the optical axis, G12 is a distance between the image side surface of the first lens element and the object side surface of the second lens element along the optical axis, and G34 is a distance between the image side surface of the third lens element and the object side surface of the fourth lens element along the optical axis.

12. The optical imaging lens as claimed in claim 1, wherein the optical imaging lens further satisfies a condition as follows:

(G12+T3+T5+T6)/(T1+G23)≤3.000, wherein G12 is a distance between the image side surface of the first lens element and the object side surface of the second lens element along the optical axis, T3 is a thickness of the third lens element along the optical axis, T5 is a thickness of the fifth lens element along the optical axis, T1 is a thickness of the first lens element along the optical axis, and G23 is a distance between the image side surface of the second lens element and the object side surface of the third lens element along the optical axis.

13. The optical imaging lens as claimed in claim 1, wherein the optical imaging lens further satisfies a condition as follows:

EFL/(T1+T2)≤4.000, wherein EFL is an effective focal length of the optical imaging lens, T1 is a thickness of the first lens element along the optical axis, and T2 is a thickness of the second lens element along the optical axis.

14. The optical imaging lens as claimed in claim 1, wherein the optical imaging lens further satisfies a condition as follows:

EFL/(G12+G45+G56)≤7.200, wherein EFL is an effective focal length of the optical imaging lens, G12 is a distance between the image side surface of the first lens element and the object side surface of the second lens element along the optical axis, G45 is a distance between the image side surface of the fourth lens element and the object side surface of the fifth lens element along the optical axis, and G56 is a distance between the image side surface of the fifth lens element and the object side surface of the sixth lens element along the optical axis.

15. The optical imaging lens as claimed in claim 1, wherein the optical imaging lens further satisfies a condition as follows:

TTL/(T1+G23)≤9.000, wherein T1 is a thickness of the first lens element along the optical axis, and G23 is a distance between the image side surface of the second lens element and the object side surface of the third lens element along the optical axis.

16. The optical imaging lens as claimed in claim 1, wherein the optical imaging lens further satisfies a condition as follows:

(T3+G34+T4)/(T1 T2)≤2.000, wherein T3 is a thickness of the third lens element along the optical axis, G34 is a distance between the image side surface of the third lens element and the object side surface of the fourth lens element along the optical axis, T4 is a thickness of the fourth lens element along the optical axis, T1 is a thickness of the first lens element along the optical axis, and T2 is a thickness of the second lens element along the optical axis.

17. The optical imaging lens as claimed in claim 1, wherein the optical imaging lens further satisfies a condition as follows:

BFL/(G12+G23)≤3.400, wherein BFL is a distance between the image side surface of the sixth lens element and an image plane of the optical imaging lens along the optical axis, G12 is a distance between the image side surface of the first lens element and the object side surface of the second lens element along the optical axis, and G23 is a distance between the image side surface of the second lens element and the object side surface of the third lens element along the optical axis.

18. The optical imaging lens as claimed in claim 1, wherein the optical imaging lens further satisfies a condition as follows:

(T6+BFL)/(G34+G45+G56)≤8.000, wherein BFL is a distance between the image side surface of the sixth lens element and an image plane of the optical imaging lens along the optical axis, G34 is a distance between the image side surface of the third lens element and the object side surface of the fourth lens element along the optical axis, G45 is a distance between the image side surface of the fourth lens element and the object side surface of the fifth lens element along the optical axis, and G56 is a distance between the image side surface of the fifth lens element and the object side surface of the sixth lens element along the optical axis.

19. The optical imaging lens as claimed in claim 1, wherein the optical imaging lens further satisfies a condition as follows:

(AAG+BFL)/(T2+T3+T4)≤4.100, wherein AAG is a sum of a distance between the image side surface of the first lens element and the object side surface of the second lens element along the optical axis, a distance between the image side surface of the second lens element and the object side surface of the third lens element along the optical axis, a distance between the image side surface of the third lens element and the object side surface of the fourth lens element along the optical axis, a distance between the image side surface of the fourth lens element and the object side surface of the fifth lens element along the optical axis, and a distance between the image side surface of the fifth lens element and the object side surface of the sixth lens element along the optical axis, BFL is a distance between the image side surface of the sixth lens element and an image plane of the optical imaging lens along the optical axis, T2 is a thickness of the second lens element along the optical axis, T3 is a thickness of the third lens element along the optical axis, and T4 is a thickness of the fourth lens element along the optical axis.

20. The optical imaging lens as claimed in claim 1, wherein the optical imaging lens further satisfies a condition as follows:

(ALT+BFL)/(G12+G23+G34)≤6.100, wherein ALT is a total of thicknesses of all the lens elements having refracting power of the optical imaging lens along the optical axis, BFL is a distance between the image side surface of the sixth lens element and an image plane of the optical imaging lens along the optical axis, G12 is a distance between the image side surface of the first lens element and the object side surface of the second lens element along the optical axis, G23 is a distance between the image side surface of the second lens element and the object side surface of the third lens element along the optical axis, and G34 is a distance between the image side surface of the third lens element and the object side surface of the fourth lens element along the optical axis.

\* \* \* \* \*